(12) United States Patent
Hurtado

(10) Patent No.: US 10,532,934 B1
(45) Date of Patent: Jan. 14, 2020

(54) ENERGY RECYCLING AND HEAT EXCHANGE SYSTEMS

(71) Applicant: Arthur Francisco Hurtado, Riverside, CA (US)

(72) Inventor: Arthur Francisco Hurtado, Riverside, CA (US)

(*) Notice: Subject to any disclaimer, the term of this patent is extended or adjusted under 35 U.S.C. 154(b) by 316 days.

(21) Appl. No.: 15/230,295

(22) Filed: Aug. 5, 2016

Related U.S. Application Data

(63) Continuation-in-part of application No. 14/562,617, filed on Dec. 5, 2014, now Pat. No. 10,233,094.

(51) Int. Cl.
| | | |
|---|---|---|
| C02F 1/04 | (2006.01) | |
| F25B 7/00 | (2006.01) | |
| F25B 11/02 | (2006.01) | |
| F25B 27/00 | (2006.01) | |
| B01D 3/00 | (2006.01) | |
| C02F 103/08 | (2006.01) | |

(52) U.S. Cl.
CPC .......... *C02F 1/041* (2013.01); *B01D 3/007* (2013.01); *F25B 7/00* (2013.01); *F25B 11/02* (2013.01); *F25B 27/005* (2013.01); *C02F 2103/08* (2013.01)

(58) Field of Classification Search
CPC ........ C02F 1/041; C02F 1/04; C02F 2103/08; F25B 7/00; F25B 11/02; F25B 27/005; B01D 3/007; B01D 5/006; B01D 5/0039; Y02A 20/128
USPC .......................................................... 62/272
See application file for complete search history.

(56) References Cited

U.S. PATENT DOCUMENTS

| | | | |
|---|---|---|---|
| 4,033,141 A | 7/1977 | Gustafasson | |
| 4,096,039 A * | 6/1978 | Carnine | B01D 3/42 |
| | | | 202/205 |
| 4,779,427 A | 10/1988 | Rowley | |
| 4,876,856 A | 10/1989 | Iishiki | |
| 5,932,074 A | 8/1999 | Hoiss | |
| 6,804,962 B1 | 10/2004 | Prueitt | |
| 7,552,589 B2 | 6/2009 | Mok | |
| 9,784,478 B2 | 10/2017 | Hurtado | |
| 2008/0083605 A1* | 4/2008 | Holtzapple | C02F 1/041 |
| | | | 203/11 |
| 2012/0291433 A1* | 11/2012 | Meng | F01K 25/08 |
| | | | 60/641.15 |

(Continued)

FOREIGN PATENT DOCUMENTS

FR      2531418 A1    2/1984

*Primary Examiner* — Joseph F Trpisovsky

(57) ABSTRACT

A heat exchange system having at least one closed compartment containing in a first portion a first liquid having a first temperature at or near the first liquid's boiling point; a first thermally conductive conduit, containing a first fluid having a second temperature higher than the first temperature, submerged in the first liquid, causing at least a portion of the first liquid to absorb latent heat and boil within the at least one closed compartment, and convert to vapors; and a second thermally conductive conduit, containing a second fluid having a third temperature lower than the first temperature, passing through a second portion of the at least one closed compartment where the vapors contact the second thermally conductive conduit containing the second fluid, causing the vapors to lose latent heat and condense, and join the first liquid in the first portion of the at least one closed compartment.

20 Claims, 13 Drawing Sheets

(56) References Cited

U.S. PATENT DOCUMENTS

2014/0026573 A1   1/2014   Palmer

* cited by examiner

ENERGY RECYCLING AND HEAT EXCHANGE SYSTEMS

CROSS-REFERENCE TO RELATED APPLICATIONS

This application claims priority to U.S. Non-Provisional application Ser. No. 14/562,617 filed on Dec. 5, 2014, which claims priority to U.S. Provisional Application No. 61/963,472 filed on Dec. 6, 2013, U.S. Provisional Application No. 61/995,308 filed on Apr. 8, 2014, and U.S. Provisional Application No. 62/071,542 filed on Sep. 29, 2014; and this application also claims priority to U.S. Non-Provisional application Ser. No. 14/048,523 filed on Oct. 8, 2013, which claims priority to U.S. Provisional Application No. 61/795,143 filed on Oct. 12, 2012 and U.S. Provisional Application No. 62/282,623 filed on Aug. 7, 2015, and the respective disclosures are incorporated herein by reference to the extent that they do not conflict with the present application.

BACKGROUND OF THE INVENTION

1. Field of the Invention

The present invention relates generally to distillation systems and methods, and particularly to a low cost, energy-saving method and system for distilling, desalinating or purifying water.

2. Description of the Related Art

Distillation is well known process and involves heating a liquid until it boils into a gas-phase, then condensing the gas back into a liquid-phase and collecting the condensed gas. The heating of the liquid involves high energy consumption, which makes the distillation process expensive. What is needed is a new and improved distillation method and system that achieve the same results with a considerably less amount of energy.

The aspects or the problems and the associated solutions presented in this section could be or could have been pursued; they are not necessarily approaches that have been previously conceived or pursued. Therefore, unless otherwise indicated, it should not be assumed that any of the approaches presented in this section qualify as prior art merely by virtue of their presence in this section of the application.

BRIEF INVENTION SUMMARY

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

In one exemplary embodiment, the system to distill seawater with a condensing probe and recycled heat includes a compressor that is powered by an external motor or by energy derived from an expansion system. The compressor draws in water vapor from the boiling seawater contained in an evaporator and compresses the vapor to an elevated temperature into a condenser where it condenses into pure water. In this example, it is assumed that the starting temperature of the seawater in the evaporator is preheated to 212 F.° and the steam from the evaporator is compressed to a temperature of 222 F.°.

In another exemplary embodiment, the system to distill seawater with a condensing probe and recycled heat recycles the heat in the distillation process and reuses the heat to run the distillation process again, creating an energy loop. To help achieve this process, the condenser is placed within the evaporator so that the heat given off by the condenser is absorbed by the boiling seawater in the evaporator. This is particularly important, in that the latent heat of condensation is absorbed by the latent heat of vaporization. The reabsorption of the latent heat back into the system greatly reduces the amount of external energy required to operate the distillation process. The latent heat of vaporization comprises the greatest portion of heat required to operate the distillation process. As an example, the latent heat of vaporization of water at 100 degrees C.° is approximately 540 cal./gm. However if this heat is recycled it would greatly decrease the amount of energy required to run the process.

In another exemplary embodiment the system to distill seawater with a condensing probe and recycled heat utilizes at a given pressure, seawater that boils at a slightly higher temperature than pure water. For example, at atmospheric pressure, pure water boils at 100 C and seawater boils at 102 C. For this reason the vapor emitted from the evaporator containing the boiling seawater is compressed to a higher temperature so that the water vapor may be directed back into the cooler evaporator and condensed. In this process, heat is returned and recycled back to the evaporator. In discussing the following embodiments and for simplification, it is assumed that distilled water and seawater have the same boiling point and the latent heat of vaporization is the same at a given temperature and pressure.

The above embodiments and advantages, as well as other embodiments and advantages, will become apparent from the ensuing description and accompanying drawings.

BRIEF DESCRIPTION OF THE DRAWINGS

For exemplification purposes, and not for limitation purposes, aspects, embodiments or examples of the invention are illustrated in the figures of the accompanying drawings, in which.

DETAILED DESCRIPTION

Figure 1:
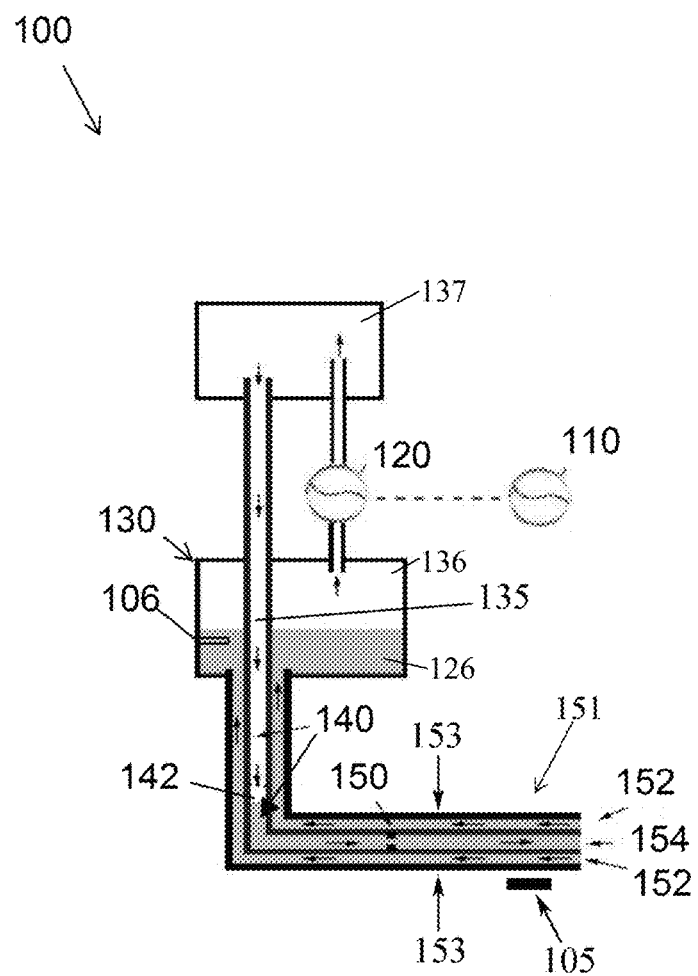
FIG. 1 illustrates a diagram of a distillation system, according to an aspect.

What follows is a description of various aspects, embodiments and/or examples in which the invention may be practiced. Reference will be made to the attached drawings, and the information included in the drawings is part of this detailed description. The aspects, embodiments and/or examples described herein are presented for exemplification purposes, and not for limitation purposes. It should be understood that structural and/or logical modifications could be made by someone of ordinary skills in the art without departing from the scope of the invention. Therefore, the scope of the invention is defined by the accompanying claims and their equivalents.

FIG. 1 illustrates a diagram of a distillation system, according to an embodiment. As shown, the distillation system 100 having a condenser 135 immersed within the seawater 126 contained in evaporator 130 and in addition may have a condensing probe 140, an extension of condenser 135, that may be encircled by an outer pipe 153 containing incoming seawater 152, such that heat is transferred from the condensing probe 140 into the encircled seawater 152. Preferably, the condensing probe 140 is configured to increase the surface area and duration that heat is transferred from the high temperature steam 137 onto the incoming seawater 152. To this end, the condensing probe 140 depicted in FIG. 1 and described herein is only an example. Various other configurations may be adopted. For example a plurality of probes may be utilized to increase further the surface area and thus increase heat transfer. It is advantageous to insert the condensing probe 140 deep into the encircling seawater to insure early contact with the cool incoming seawater. In this regard the incoming seawater begins to absorb heat early on and by the time it reaches the evaporator 130, enough heat should have been absorbed and its temperature should have gradually risen to the level of the temperature of the seawater 126 boiling in the evaporator 130. A heat source 105, 305 may be applied to the incoming seawater 152, as necessary, to any point prior to reaching the area of the condensing probe 140 to ensure the seawater reaches the desired temperature as it enters the evaporator 130.

The highest temperature level of the seawater is in the evaporator 130 and the lowest temperature level is at the holding reservoir (FIG. 2, 230) as it enters the system. Hence the greatest rate of condensation within the condensing probe 140 occurs when the steam 137 initially comes in contact with the cool incoming seawater 152 and slowest rate of condensation occurs when the condensing probe 140 approximates the evaporator 130.

To some extent the early onset of condensation within the condensing probe 140 at the cooler regions of the incoming seawater help decrease the pressure level within the condensing probe 140 and hence the work required by the compressor 120 to compress the vapor 136 from the evaporator 130 into the condenser 135. Since a portion of the steam 137 has condensed at the cooler regions of the incoming seawater, it has a suction effect on the vapor entering the condensing probe 140 from the compressor 120.

A form of circulation occurs as the incoming seawater 152 boils at the outer surface of the condensing probe 140 and bubbles ascend into the evaporator 130. This improves heat exchange and helps speed up the distillation rate.

Insulation may be applied to the distal portion and the tip 142 of the condensing probe 140, as necessary, to slow down and regulate the rate of heat transfer and avoid extreme temperature differentials between the high temperature of the steam 137 within the condensing probe 140 and the cool temperature of the incoming seawater 152, to prevent cracking or damage to the condensing probe 140 due to the extreme temperature differences.

A flow regulator 150 may be placed near the end of the outflow of the condensed water 154 to regulate the amount of steam 137 contained within the condensing probe 140 and the duration the steam 137 conducts heat into the inflow of seawater 152, thus regulating the rate of heat exchange into the incoming seawater 152 to assure and regulate the time duration for optimum heat transfer. Also, by regulating the outflow of condensed water 154, suitable pressure within the condensing probe 140 is maintained avoiding the temperature of the steam to drop below the temperature of the evaporator 130. If the pressure in the condensing probe 140 is higher than atmospheric pressure, the condensed water 154 should flow out as the flow regulator 150 releases.

Subsequent to the condensation of the steam 137, the outflow of condensed water 154 exiting the condensing probe 140 still contains usable heat capable of being recycled back to the system. A counter current heat exchange system 151 (FIG. 2, 200) may help recapture and recycle this heat back into the distillation system 100.

As the condensed water 154 and seawater 152 flow in opposite directions, heat from the condensed hot water 154 is gradually given-off to the surrounding incoming cooler seawater 152. Hence, the outflowing condensed water 154 becomes cooler. Conversely the inflowing seawater 152 becomes hotter as it absorbs heat and approaches the condensing probe 140 and ultimately the evaporator 130.

The compressor 120 may be actuated by an external motor 110 or by other means as it will be explained hereinafter when referring to FIGS. 3-4 for example. The compressor 120 draws in water vapor 136 from the boiling seawater contained in an evaporator 130 and compresses the vapor into a condenser 135 and further into a condensing probe 140 as shown, where it condenses into pure water.

Thus, it should be apparent that an important aspect is to recycle the heat in the distillation process and reuse the heat to run the distillation process again, creating an energy loop. To help achieve this process, the condenser 135 and/or the condensing probe 140 may be placed completely or partially (as shown in FIG. 1) within the evaporator 130 so that the heat given off by the condenser 135 is absorbed by the boiling seawater 126 in the evaporator. Any portions of the condenser 135 or condensing probe 140 not placed within the evaporator 130 or within a heat exchange system 151, would preferably need to be insulated such that to prevent heat loss by the distillation system 100. This is particularly important, in that this causes the latent heat of condensation to be absorbed by the latent heat of vaporization. The reabsorption of the latent heat back into the system greatly reduces the amount of external energy required to operate the distillation process. The latent heat of vaporization comprises the greatest portion of heat required to operate the distillation process. As an example, the latent heat of vaporization of water at 100 degrees C. is approximately 540 cal/gm. However, if this heat is recycled, rather than allowing the heat to escape into the environment, it would greatly decrease the amount of energy required to run the distillation system.

For the purpose of this discussion, for simplification, we are assuming that distilled water and seawater have the same boiling point and latent heat of vaporization at a given temperature and pressure. In this example, also for simplification, we are assuming that the starting temperature of the seawater 126 in the evaporator 130 is preheated to 212 Fahrenheit (F) and the steam 136 from the evaporator is compressed by compressor 120 to a temperature of 222 F. However, in reality at a given pressure, seawater boils at a slighter higher temperature than pure water, (approximately 102 Celsius degree (216° F.) at sea level). For this reason, the steam 136 emitted from the evaporator 130 containing the boiling seawater 126 is compressed into a higher temperature (222 F) so that the steam 137 may be, as explained earlier, passed through the cooler evaporator 130 and condensed. In this process heat is returned and recycled back to the evaporator.

It should be understood that, the starting temperature of the evaporator 130, as well as any heat required to maintain its temperature due to heat loss of the system, may be provided by a heating source either through heating elements 106, solar energy or burning of fuels or other suitable means.

The preceding example pertains to distilling seawater to obtain pure water. However, any liquid, for example liquid chemicals used in industries, or unpurified water may be distilled using the system from FIG. 1, including that of treatment facilities, brackish water, etc.

Figure 2:
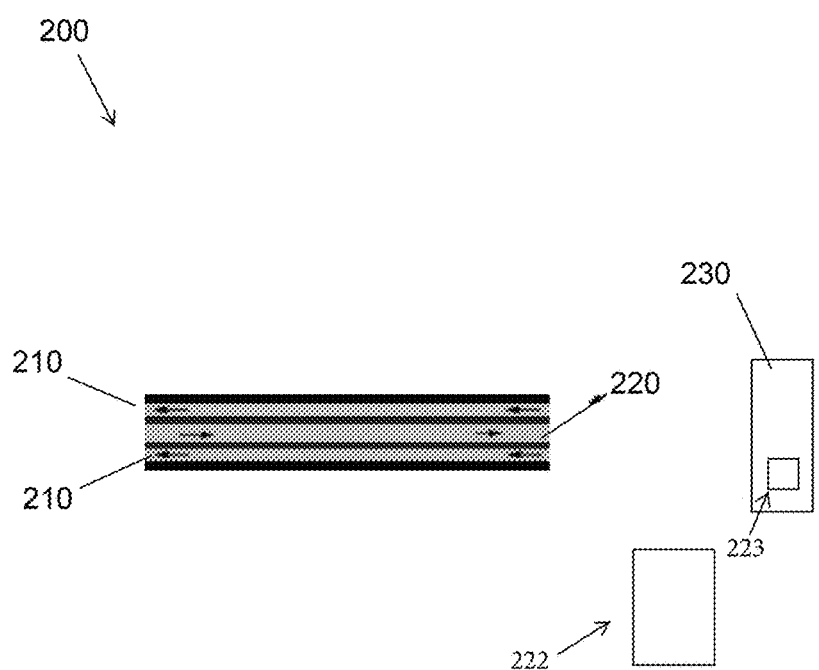
FIG. 2 illustrates a diagram of a counter current heat exchange system, according to an aspect.

FIG. 2 illustrates a diagram of a counter current heat exchange system 200.

A complete heat exchange is difficult if not impossible. However, the goal is to come as close as possible to a complete heat exchange.

Toward the end of the outflow of the condensed water 220, the temperature of the condensed water 220 is the lowest and the heat absorption rate is the slowest. At this point, to optimize heat exchange, the condensed water 220 may be passed through coils or radiators, before it enters a condensed water holding tank 222. Furthermore, the outflowing condensed water 220 may be piped through and stored in container(s) 223 within the holding reservoir 230 containing the inflowing seawater, so that the last bit of the heat from the condensed water 220 is transferred to the sea water 210 therein. The storage containers 223 should be constructed of material that readily conducts heat.

Theoretically, if the counter current heat exchange 200 is long enough and insulated well to prevent heat loss, the condensed water 220 may give off enough heat and its temperature may be reduced to be the same or close to the temperature of the incoming seawater 210 and the temperature of the incoming seawater 210 may absorb heat and its temperature increased to be the same or close to the temperature of the condensed water 220 leaving the condensing probe (FIG. 1, 140).

Expansive Section

Figure 3:
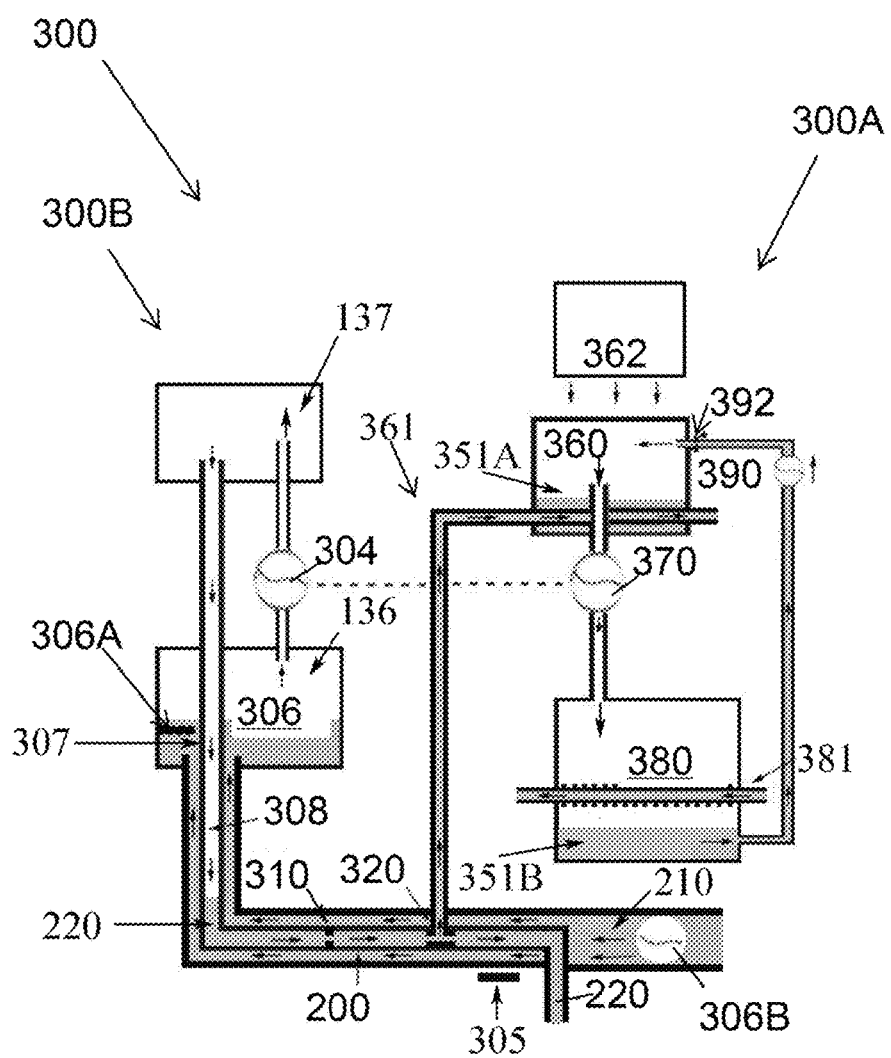
FIG. 3 illustrates a diagram of a distillation system having an expansive section as a source of energy to power the distillation system, according to an aspect.

FIG. 3 illustrates a diagram of a distillation system having an expansive section as a source of energy to power the distillation system, replacing or augmenting motor 110, according to an embodiment.

An important aspect of the distillation system 300 of FIG. 3 is the use of a fluid 351A and 351B in which the fluid 351A and fluid 351B may be a refrigerant, R-410A for example. In this example, refrigerant R-410A, 351A is in a gas phase and liquid phase mixture contained in an evaporator or a boiler 360, and may absorb heat from its surroundings causing the refrigerant 351A to boil. The increase in the refrigerant vapor 351A in the boiler 360 causes an increase in pressure. The pressurized refrigerant vapor 351A is preferably communicated from the boiler 360 through an expander 370 into condenser 380 where the gas-phase refrigerant 351A condenses into a liquid-phase 351B, resulting in a decrease in pressure in condenser 380. Heat may be expelled from condenser 380 into a cooler environment. The expander 370 is placed between the high pressure of the boiler 360 and the low pressure of condenser 380. The expander 370 is preferably actuated by the difference in pressure between the boiler 360 and condenser 380 and the energy derived from the expander 370 is transferred to and actuates the compressor 304 of the compressive section 300B of the distillation system 300. The condensed liquid-phase refrigerant 351B is preferably pumped from condenser 380 back into the boiler 360 via a pump 390.

The portion of the system from which energy is derived, including the boiler 360, expander 370 and condenser 380 is termed the expansive section 300A and the portion of the section in which the compressor 304 compresses vapor, including the evaporator 306, compressor 304, condenser 307 and the condensing probe 308 are termed the compressive section 300B.

An option for enhancing the vaporization of the liquid-phase refrigerant 351B, as it enters the boiler 360, is to pump the liquid-phase refrigerant 351B with sufficient force through an expansion valve 392 creating a spray of the refrigerant 351B. The sudden drop in pressure causes the refrigerant 351B droplets to vaporize more readily.

The heat source for the boiler 360 may preferably come from ambient temperatures or may be fortified by, for example, solar energy such as from parabolic reflectors, reflective mirrors 362, solar panels or the like.

As previously discussed, the heat source for the evaporator 306/130 for providing the starting temperature and temperature maintenance of the seawater may be provided by a heating element 306A/106, solar energy, burning fuels or the like.

A pump 306B may be provided to increase the pressure of the incoming seawater into the evaporator 306 thus providing for higher boiling temperatures of the seawater. As it will be discussed later, greater yields of distilled water are achieved when the temperature of the seawater in the evaporator is at higher levels. This is due to the vapor concentration and saturation points becoming higher as the temperature of the water vapor increases. Together, in association with the compressor 304, the pump 306B and the outflow regulating valve 310 regulate and maintain the pressure and temperature of the evaporator 306 and the condensing probe 308. Pump 306B may also be used to increase heat exchange by circulating the seawater about the condensing probe 308. For example, a whirling motion of the seawater around the condensing probe 308 may be created by the implementation of pump 306B, or the like, having a dual role and acting as an impeller to circulate the seawater.

Another option of reutilizing heat is to divert a portion or all of the outflow of the condensed water 220, through piping 361, into the boiler 360 of the expansive section 300A. This is particularly useful at the end phase of the counter current heat exchange 200. At the end phase, the condensed water 220 is at a low temperature due to most of its heat having been given-off. Additionally, at this point there is a slow rate of heat exchange. Provided the temperature of the condensed water 220, diverted into piping 361, is high enough to cause the refrigerant 351 A to boil in the boiler 360, the low grade heat of the condensed water 220 will be absorbed by the latent heat of the boiling refrigerant 351 A. The absorption of heat, in this manner, is at a much faster rate than it would have been if the condensed water 220 would have ran its normal course and had exchanged its heat through ordinary conduction. Furthermore, the heat from the diverted condensed water 220 may be utilized by the boiler 360 as an energy source to help drive the expander 370. A 3-way valve 320 may regulate the portion of the condensed water 220 delivered to the boiler 360 of the expansive section 300A of the system. As an option, heat from condenser 135/307 may also be diverted through piping 361 to boiler 360 in the form of steam before it becomes condensed in condensing probe 140/308 or may be diverted in the form of condensed water 220 at any point along the counter current heat exchange system 151. In the instance where steam is diverted to boiler 360, the steam becomes condensed in boiler 360. In each instance whether the heat is derived from steam or condensed water, the heat given off is captured as an energy source by boiler 360 as refrigerant 351A expands during boiling and help drive the expander 370. It is noted that heat from condenser 307 either in form of steam 137 or condensed water 220 may be diverted through piping 361 into boiler 360 and bypassing either the condensing probe 308 or counter current heat exchange system 200 or both.

Piped cool ocean water 381 may be utilized to condense the refrigerant 351A in condenser 380 of the expansive section 300A of the system. Seawater of cooler temperatures may be obtained from the depths of the ocean, thus providing a greater temperature differential between the boiler 360 and condenser 380 and in turn a greater force exerted on the expander 370. As the piped ocean water 381 passes through condenser 380, heat is absorbed and transferred to the ocean water 381.

Yet another embodiment involving the recapturing of heat is to make use of the heated ocean water as it exits condenser 380. This embodiment includes piping the cool seawater 381 through the chamber of condenser 380. As refrigerant 351A vapor becomes condensed, heat is transferred to the cool incoming piped seawater 380. As a result, the seawater 380 becomes pre-warmed and then may be stored in a holding reservoir (FIG. 2, 230) before it enters the counter current heat exchange system 200 and subsequently into the evaporator 306 of the compressive section 300B of the distillation system. The pre-warmed seawater may also enter the evaporator 306 directly bypassing the counter current heat exchange system 200.

Figure 4:
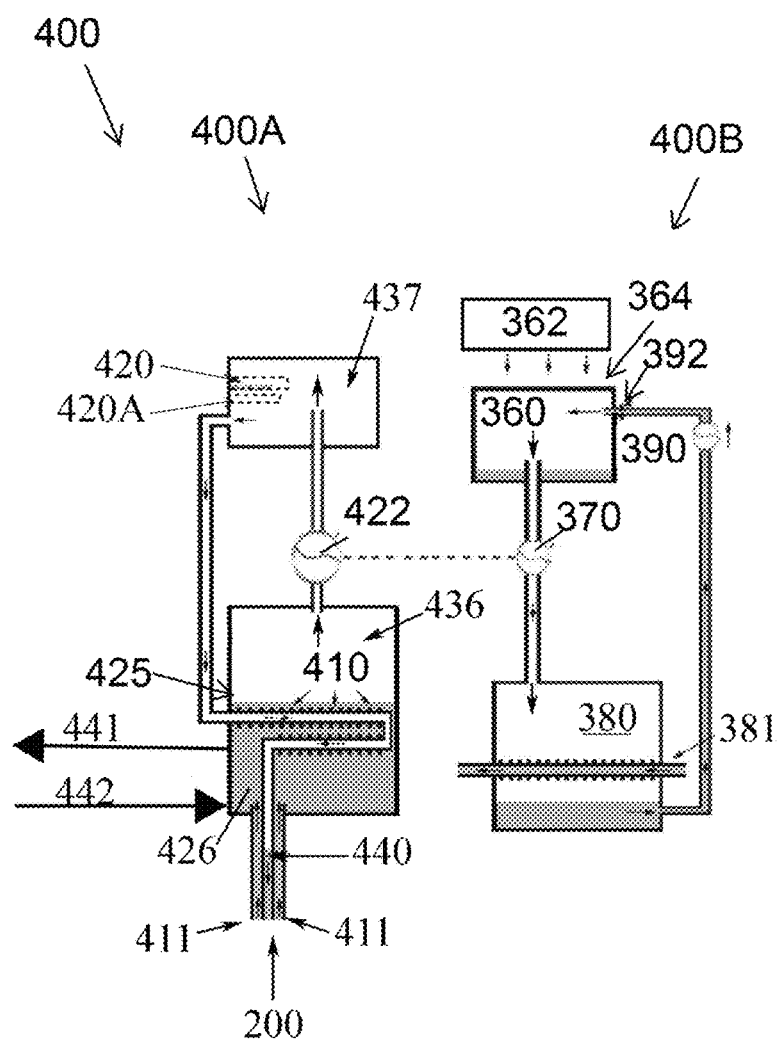
FIG. 4 illustrates a diagram of a distillation system having an expansive section as a source of energy to power the distillation system and a more elaborate condenser with an increased surface area, according to an aspect.

FIG. 4 illustrates a diagram of a distillation system 400 having an expansive section 400B as a source of energy to power the distillation system and a more elaborate condenser 410 having an increased surface area, according to an embodiment.

The evaporator 425 receives seawater 411 from the counter current heat exchange system 200 and at this point (when entering the evaporator 425) the temperature level of the seawater 426 contained in evaporator 425 should be at or near the temperature of its boiling point. At this point the seawater 426 has initially reached its boiling point. However, the seawater 426 must still gain additional heat to overcome the latent heat requirement in order for it to boil. Since latent heat requires the greatest portion of heat in the distillation process, a condenser 410 filled with steam having a temperature greater than that of the seawater 426 from evaporator 426 as well as having an increased surface area is desirable.

For the purpose of simplification, the heat recycling element 361, shown in FIG. 3, regarding diverting the piped condensed hot water 220 or steam 137 from the counter current heat exchange system 200 has been omitted from the drawing of FIG. 4. However, all of the embodiments and elements of FIG. 3 may be incorporated into FIG. 4.

A heating source or element 420 coupled to a circulating fan 420A, similar to that of a hair dryer, may be placed inside the chamber leading to the condenser 410 to heat the steam 437 of the condenser 410 to assure the temperature of the steam 437in the condenser 410 is adequately above the temperature of the evaporator 425. Less heat is required to heat the steam in the condenser 410 than it is to heat the liquid water in the evaporator 425. To raise the temperature of 1 Kg of steam by 1° C. requires half the amount of heat to raise the same quantity of liquid water by 1° C.

Additionally there may be times when the seawater 426 within evaporator 425 may be heated by heating source 306A or heating incoming seawater 220 by source 305 prior to entering evaporator 425 to increase or maintain the temperature at a desired starting point or during times when the process of recycling heat is insufficient or faulty.

FIG. 3 and FIG. 4 depict the expansive section 400B of the system producing the energy to drive the compressive section 400A of the system. However, the expansive section 400B of the system may be eliminated and instead driven by a motor 110 or the like, as illustrated in FIG. 1. Use of the expansive section 400B however, may increase the efficiency of the distillation system 400 (300 in FIG. 3) as it may be powered by readily available heat energy in the environment (e.g., solar heat captured by solar panels, mirrors, or solar heat accumulated in the attic of houses, etc).

Additionally, on days when the sun is not strong enough to provide the boiler 360 with sufficient energy to fully drive the compressor 422, external energy may be applied to augment the work of the expander 370. The external energy may be in the form of a motor 110 (or other energy source), coupled to the expander 370 and/or the compressor 422. In the augmentation configuration, the expander 370 may derive its energy partially from a solar source and the remaining portion from an external augmenting motor.

Example 1 is an illustration of a mechanical advantage system in which the fluid 351A, 351B is refrigerant R-410A and is being used in the expansive section 400B to drive the compressive section 400A to distill water. The boiler 360 contains a gas phase and liquid phase mixture of the refrigerant R-410 351A. Evaporator 425 contains seawater and condenser 410 contains condensed or the resultant distilled water 440. For the purpose of this illustration, it is assumed that seawater and pure water have the same boiling points.

The following example assumes a starting temperature in the evaporator 425 to be 212 F.° and that all of the heat is circulated back into the system 400.

Example 1

Chart 1 lists the parameters to be applied to the systems illustrated in FIG. 3 or FIG. 4.

CHART 1

| Water | | |
|---|---|---|
| Condenser 410: | Temperature 222 F.° | Pressure 18 PSI (denoted by P1) |
| Evaporator 425: | Temperature 212 F.° | Pressure 14.69 PSI (denoted by P2) |
| R-410A | | |
| Boiler 360: | Temperature 80 F.° | Pressure 236 PSI (denoted by P3) |
| Condenser 380: | Temperature 70 F.° | Pressure 201.5 PSI (denoted by P4) |

Utilizing the parameters listed in Chart 1 and if $A2=1$ unit:

$$A1(P1-P2)=A2(P3-P4)$$

Compressive   Expansive $$A1(18-14.69)\ \text{PSI}=A2(236-201.5)\ \text{PSI}.$$

$$(A1)3.31\ \text{PSI}=34.5\ \text{PSI}$$

$$A1=10.42\ \text{sq.in.} \quad\quad \text{Equation 1}$$

Note: A1 and A2 is the area that partitions the difference in pressure acting upon compressor 422 and expander 370 respectively. At equilibrium there is a mechanical advantage of 10.42. If the area of displacement is proportional to the volume of displacement, then for every cubic meter of R410-A vapor displaced by the expander 370, 10.42 cubic meters are displaced by the compressor 422.

If the compressor displaces 10.42 times the volume of the expander, then:

$$P1V1=P2V2\ \text{or Work 1=Work 2}$$

Work 1 compresses and Work 2 expands or 3.31 PSI (10.42 cubic meters)=34.5 PSI(1 cubic meter)

34.5 PSI (cubic meter)=34.5 PSI (cubic meter)

If the temperature of evaporator 306/425 is 212° F. then the density of steam at this temperature is 0.590 Kg/cubic meter: There is a yield of: 10.42 (0.590 Kg/cubic meter) =6.14 Kg of water for every cubic meter of R410-A displaced by the expander 370.

A relatively small temperature difference of 10° F., between the temperature of the ambient air and that of the ocean water, is required to operate the system. In this example, this temperature difference between the ambient air and the ocean water may be readily obtained naturally from the environment.

However, if the parabolic reflector or reflective mirrors 362 or other sources were utilized to provide additional heat to the boiler 360, much greater yields may be produced.

For example, if the temperature of the boiler 360 was raised by 10° F. to a temperature of 90° F., utilizing similar calculations as those performed in Example 1, a yield of 12.97 Kg of water for every cubic meter of R410-A displaced by the expander 370 would be obtained.

Compared to the boiler being at 80° F., producing a yield of 6.14 Kg/cubic meter, the boiler at 90° F. produces a yield of 12.97 Kg/cubic meter. The yield has more than doubled. Alternatively, the option of utilizing a motor 110 as shown in FIG. 1 or a combination of a motor 110 and an expansive section 400B to operate the compressive section 400A may be implemented.

Creating a Heat Loop

Assuming that most of the heat was recycled and there was minimal heat loss in the compressive section 400A of the system, the compressive section 400A would be assumed to be a closed loop system. When the expander 370 drives the compressor 422, energy is introduced into the closed loop as the compressor 422 increases the temperature of the steam 437 in the condenser 410. If the recycling mechanism was efficient enough, most of the heat would return back into the compressive section 400A, including the heat that was introduced by the expander 370. Theoretically, the temperature of the evaporator 425 would eventually increase and hence increase the temperature of the entire compressive section 400A. This is taking into consideration that the energy introduced by the expander 370 becomes incorporated into part of the total heat contained in the compressive section 400A.

If both the seawater 426 in the evaporator 425 and the condensed water 220 was at a temperature of 212° F. and assumed to contained the same amount of internal heat and that if all the heat was recycled back into the loop, the only energy needed to run the process would be that of raising the temperature level of the steam 436 from the evaporator 425 just high enough so that the steam 437 may condense and give-off heat back to the cooler seawater 426 in the evaporator 425.

Insulation is of great importance in minimizing heat loss. An effective method of insulation is that of encasing the components of the compressive section 400A and creating a vacuum between the components and encasing. This would function much like that of a thermos.

All heat exchange elements may be comprised of coils, radiators, tube convolutions or the like to increase surface area for the purpose of achieving optimum heat exchange.

The introduction of external energy, into the heat loop by pumping the inflow of seawater 210 to elevated pressures into the evaporator 306/425 also becomes recycled. The pump 306B steps up the system by increasing the pressure in the evaporator 306/425 and elevating the starting temperature in which the seawater 426 boils (see FIG. 3). The expander 370, driving the compressor 304/422, is now able to compress the steam 436 from the stepped-up evaporator 425 into a proportionally higher pressure and temperature into the condenser 410/307/308. The steam 437 within the condenser 410 is then able to transfer heat, at a higher temperature level, back into the evaporator 425, thus maintaining the stepped-up temperature of the evaporator 425. Heat, if required, may be applied to the seawater in the evaporator 425 to maintain or stabilize the system.

Salt Removal from the Evaporator

In order to preserve heat, the salt that becomes concentrated in the evaporator 425 may be expelled with the use of a second counter current heat exchange system. However, in this second counter current application the outgoing salt water 441 leaving evaporator 425 has much more salt concentrated than the incoming seawater 442. As the high salt-concentrated water 426 of evaporator 425 is being replaced with the less-concentrated incoming seawater 442, the salt level of the salt water 426 in evaporator 425 becomes less concentrated. Similarly, as previously illustrated in the counter current heat exchange system 200 in FIG. 2, the outgoing salt water 441 may be encircled by the incoming seawater 442 and in the process the incoming seawater 442 absorbs the heat from the outgoing salt water 441, thereby recycling and preserving heat. Furthermore, the seawater 426 in evaporator 425 may be allowed to concentrate to the point the concentrated salt precipitates out of solution and settles to the bottom. The precipitated salt may then be pumped out.

Figures 5A, 5B:
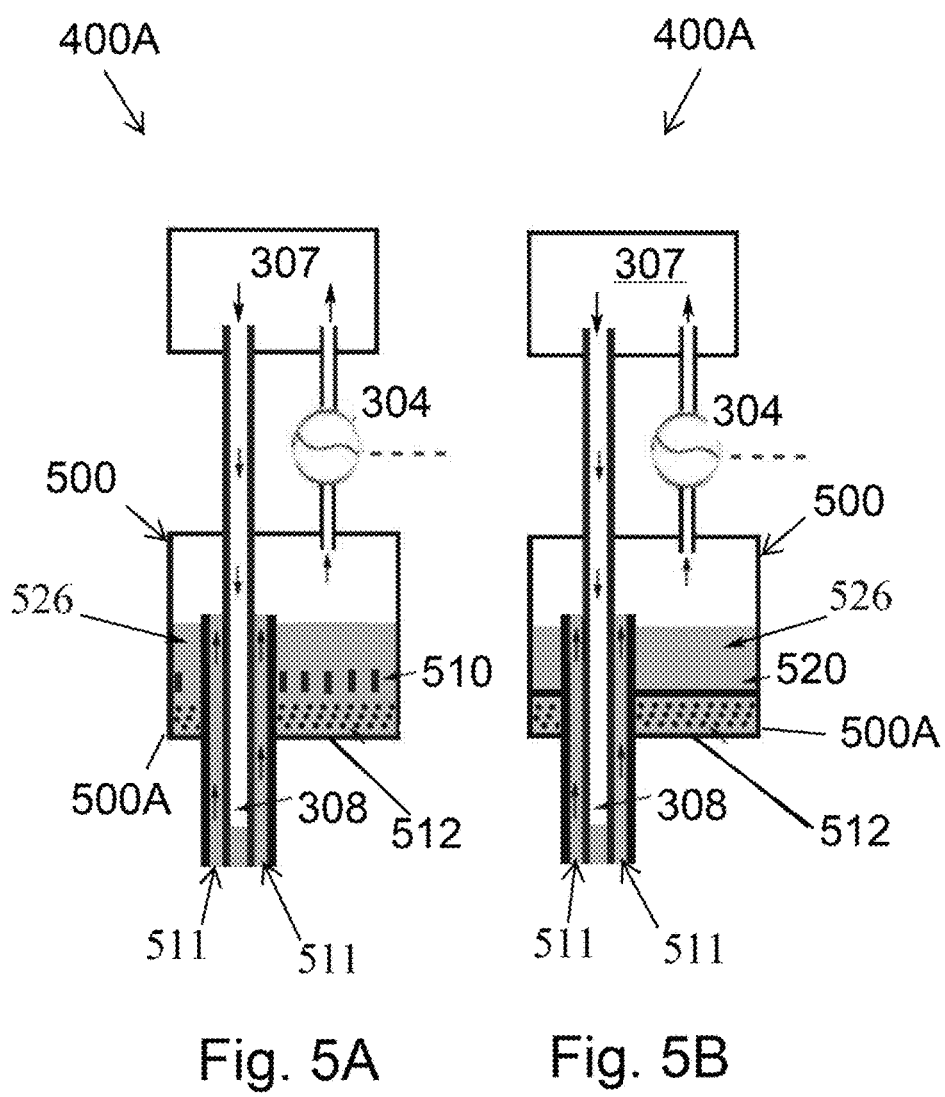
FIG. 5A illustrates a partial diagram of a distillation system having an evaporator with a plurality of vertical blades, according to an aspect.
FIG. 5B illustrates a partial diagram of a distillation system having an evaporator with a plurality of horizontal blades, according to an aspect.

FIG. 5A illustrates a partial diagram of a distillation system having an evaporator with a plurality of vertical blades, according to an embodiment.

A series of vertical blades 510 may be placed across the lower portion of evaporator 500, allowing the precipitated salt to pass between the vertical blades 510 and settle onto a tray 512 located at the bottom 500A of evaporator 500.

FIG. 5B illustrates a partial diagram of a distillation system having an evaporator with a plurality of horizontal blades, according to an embodiment.

When the tray 512 becomes filled with salt, the tray 512 is then compartmentalized as the vertical blades 510 rotate horizontally and create a partition separating the tray 512 from the seawater 526 contained in evaporator 500. Once compartmentalized, the tray 512 may be removed from the bottom 500 A of evaporator 500 and emptied of its precipitated salt content. The empty tray 512 is then placed back into the bottom of evaporator 500 and the horizontal blades 520 resume their vertical position. The intake of seawater 511 is pumped to a higher level than the seawater 526 contained in evaporator 500 to avoid the back flow of the concentrated seawater 526.

Seawater containing higher concentrations of salt has higher boiling temperatures. However, this is of less significance if the heat is recycled and returned back through the loop. It is noted that the particular parameters utilized in these examples are for illustrative purposes, and an array of different parameters and types of refrigerants may be utilized that may produce similar or improved results.

Overview of the Process

The boiler 360 contains a gas phase and liquid phase mixture of refrigerant R-410A 351A and absorbs heat from any available source including ambient heat, sun panels or parabolic reflectors 362. In this particular illustration the temperature of the refrigerant R-410A (351A in the boiler 360) is 80° F. and pressure is 236 PSI. The refrigerant R-410A being utilized in this example is for illustrative purposes only, any other refrigerant or liquid may be utilized in its place.

Condenser 380 transforms gas-phase refrigerant 351A to liquid-phase refrigerant 351 Band gives-off heat to the cool incoming piped seawater 381. The temperature in condenser 380 containing R-410A is 70° F. and the pressure is 201 PSI.

Evaporator 425 contains seawater 426 to be distilled. The temperature of the seawater 426 in evaporator 425 is 212° F. and the pressure is 14.69 PSI.

Condenser 410 is located within evaporator 425. The steam 437 in condenser 410 condenses into pure water 440 as it gives-off heat to the seawater 426 in evaporator 425. The temperature in condenser 410 containing steam 437 is 222° F. and the pressure is 18 PSI.

The compressor 422 draws steam 436 from the seawater 426 contained in evaporator 425 and compresses it into condenser 410. The temperature of the seawater in evaporator 425 is 212 F.° and the temperature of the steam 437 in condenser 410 is 222° F. Condenser 410 is located within evaporator 425, and concurrently, heat is reabsorbed from condenser 410 back to the seawater 426 in evaporator 425. In this manner latent heat becomes recycled as the latent heat is given-off from condenser 410 and absorbed by the evaporator 425.

Example 2 is an illustration showing a decrease in the level of mechanical advantage when water is utilized on the expansive section 400B, instead of R410A. Taking for example the parameters of chart 1 and instead of using R-410A on the expansive section 400B, R-410A is replaced with water. All temperature parameters remain the same as depicted in example 1 and listed in chart 1. However, both the compressive section 400A and the expansive section 400B of the system use water.

Example 2

Use of Water as the Refrigerant

Chart 2 lists the parameters to be applied in the system illustrated in FIG. 3 and FIG. 4.

CHART 2

| | Water | |
|---|---|---|
| Condenser 410 | Temperature 222° F. | Pressure 18 PSI (denoted by P1) |
| Evaporator 425 | Temperature 212° F. | Pressure 14.69 PSI (denoted by P2) |
| Boiler 360 | Temperature 80° F. | Pressure .507 PSI (denoted by P3) |
| Condenser 380 | Temperature 70° F. | Pressure .363 PSI (denoted by P4) |

Utilizing the parameters listed in Chart 1 and if A2=1 unit:
Note: A is the area that partitions and interphases the difference of pressure.

$$A1(P1-P2)=A2(P3-P4)$$

Compressive Expansive $$A1(18-14.69) \text{ PSI}=A2(0.507-0.363) \text{ PSI}.$$

$$(A1)3.31 \text{ PSI}=0.144 \text{ PSI}$$

$$A1=0.043 \text{ in}. \qquad \text{Equation 2:}$$

At equilibrium there is a mechanical advantage of 0.043.

For every cubic meter of water vapor displaced by the expander 370, 0.043 cubic meters of water vapor are displaced by the compressor 304/422.

If the compressor 304/422 displaces 0.043 times the volume of the expander 370, then:

$$P1V1=P2V2 \text{ or Work1=Work2}$$

Work 1 compresses and Work 2 expands or 3.31 PSI(0.043 cubic meters)=0.144 PSI(1 cubic meter)

0.144 PSI (cubic meter)=0.144 PSI (cubic meter)

If the temperature of the evaporator is 212 F.° then the density of steam at this temperature is 0.590 Kg/cubic meter. There is a yield of 0.043 (0.590 Kg/cubic meter)=0.025 Kg of water vapor for every cubic meter of water vapor displaced by the expander 370.

However, when utilizing R410-A in the expansive section 400B, as in example 1, it produces a much higher yield (6.14 Kg of water/cubic meter) when compared to the yield utilizing water (0.025 Kg of water/cubic meter). Utilizing R410-A in the expansive section 400B produces (6.14 kg/0.025 Kg=245.6) or 245.6 times greater yields than if water were to be utilized in the expansive section 400B.

As illustrated above, utilizing water in the expansive section 400B of this system would be impractical given that the pressure difference between the boiler 360 and the condenser 380 yields a force of only 0.144 PSI. The force acting upon the expander 370 is minimal and not sufficient to operate the system. In contrast when utilizing R410A in the expansive section 400B of this system, the pressure between the boiler 360 and the condenser 380 yields a force of 34.5 PSI.

However, the system is not intended to preclude the use of water as a refrigerant, in that water may be the refrigerant of choice in some applications. In a mechanical advantage system, utilizing two fluids having different vapor pressure properties at given parameters of temperature to produce a mechanical advantage, will be termed a chemically induced mechanical advantage. In contrast, a mechanical advantage is produced by a mechanical advantage system when the expander 370 and the compressor 304/422 simultaneously displaced a different volume of fluid. In some applications, it is advantages to use a mechanical advantage in combination with a chemically induced mechanical advantage to achieve a desired outcome.

Example 3

Example 3 illustrates that distillation systems produce greater yields with increased temperature of the seawater 426 in evaporator 306/425. In this example the temperature of the seawater 426 in evaporator 425 is 281° F. and the temperature of the condenser 410 is 291° F. Chart 3 lists the parameters to be applied in the system illustrated in FIG. 3 and FIG. 4. The parameters for the expansive section 400B remain the same as those listed in chart 1. The parameters for the compressive section 400A have been increased. However, the condenser 410 and evaporator 425 on the compressive section 400A of both chart 1 and chart 3 have a temperature difference of 10° F.

CHART 3

| Water | | |
|---|---|---|
| Condenser 410 | Temperature 291° F. | Pressure 58 PSI (denoted by P1) |
| Evaporator 425 | Temperature 281° F. | Pressure 50 PSI (denoted by P2) |
| R-410A | | |
| The Boiler 360 | Temperature 80° F. | Pressure 236 PSI (denoted by P3) |
| Condenser 380 | Temperature 70° F. | Pressure 201.5 PSI (denoted by P4) |

Utilizing the parameters listed in Chart 3 and if A2=1, then:

$$A1(P1-P2)=A2(P3-P4)$$

Compressive Expansive $$A1(58-50)\ PSI = A2(236-201.5)\ PSI.$$

$$(A1)8\ PSI = 34.5\ PSI$$

sq.in.          Equation 3

Note: A1 and A2 is the area that partitions the difference in pressure in the compressor 304/422 and expander 370 respectively. At equilibrium a mechanical advantage of 4.31 is produced.

If the area of displacement is proportional to the volume of displacement, then for every cubic meter of R410-A vapor displaced by the expander 370, 4.31 cubic meters are displaced by the compressor 304. If the temperature of the evaporator 306 is 281° F. then the density of steam at this temperature is 1.90 Kg/cubic meter:

When the temperature of the seawater 426 in evaporator 306/425 is at a temperature of 281 F.°, there is a yield of: 4.31 (1.90 Kg/cubic meter)=8.19 Kg of water for every cubic meter of R410-A displaced by the expander 370. This is a greater yield than that in example 1 producing a yield of 6.14 Kg/cubic, when the seawater 426 temperature of evaporator 306/425 is at 212° F.

Example 4

Use of the Expander to Power the System

Example 4 reduces the volume displacement of the compressor 304, illustrated in example 1, by 20%. The compressor 304 initially having a volume displacement of 10.42 (Cubic meter) PSI, now has a reduced volume displacement of 10.42 (0.20)=8.33 (Cubic meter).

Using this new parameter in equation 1, the expansive section 300A of the system will over power the compressive section 300B of the system and will have 6.9 (Cubic meter) PSI of available work to drive the compressive section 300B. The derivation is as follows:

$$P1V1=P2V2\ \text{or Work1}=\text{Work2}$$

Work 1=compressor and Work 2=expander $$8.33(3.31)=1(34.5) \quad\quad\quad \text{Equation 4}$$

27.57 (Cubic meter) PSI<34.5(1 Cubic meter) PSI $$34.5(1\ \text{Cubic meter})\ PSI - 27.57(1\ \text{Cubic meter})$$
$$PSI = 6.9\ (\text{Cubic meter}) \quad\quad \text{Equation 4}$$

The expander 370 has 6.9 (Cubic meter) PSI of surplus work available to operate the compressor 304. The surplus work overcomes the friction of compressor 304, 422 and expander 370, and allow the system to run, stand alone, or without the need of external augmented energy. The greater the surplus energy the greater the power and speed to run compressor 304, 422.

The illustrations previously discussed are only examples and the principles may also apply to other applications and scenarios utilizing different refrigerants, mechanical ratios, temperature and pressure parameters, etc.

Heat Containment System

Figure 6:
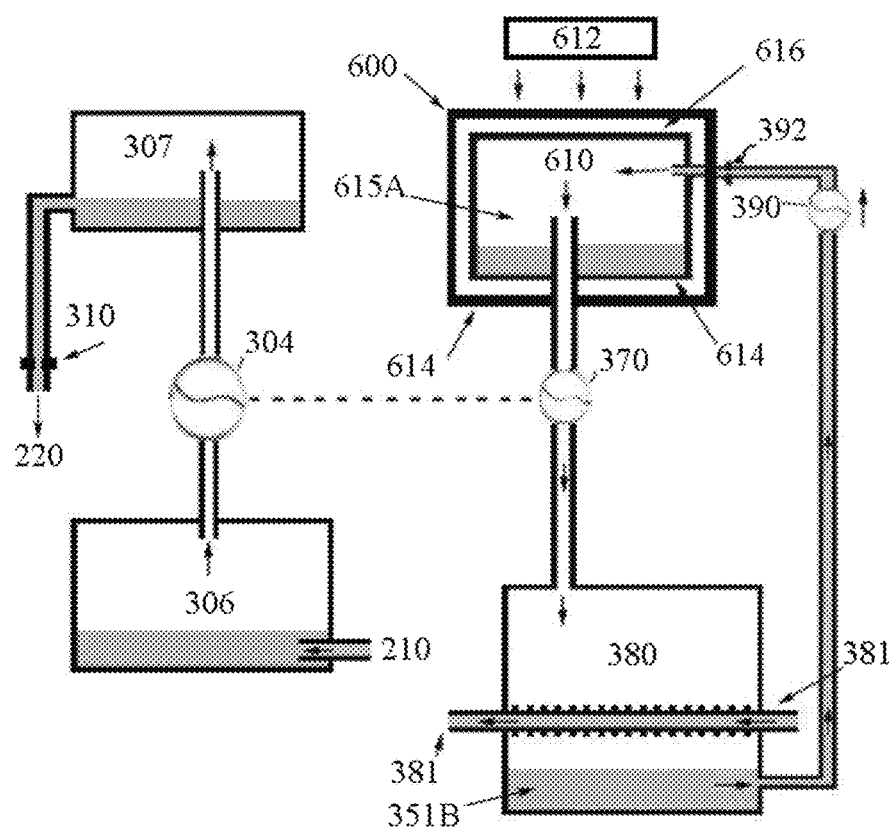
FIG. 6 illustrates a one way heat system, according to an aspect.

FIG. 6 illustrates a heat containment system 600 for the expansive section 600B of the distillation system.

Typically boilers that collect heat from sun radiation lose heat to the environment through conduction. This embodiment helps prevent such loss. Sun rays from parabolic reflectors or mirrors 612 or the like penetrate the encasement 614, heating the boiler 610 of the expansive section 600 and causing the refrigerant 615 A to boil. Sun rays are electromagnetic radiation carrying heat. And, since electromagnetic waves are not impeded by a vacuum, heat may be transferred via radiation through vacuum layer 616 and both encasements 614 and heat the refrigerant 615A of boiler 610.

As radiant energy contacts the refrigerant 615A, its energy is transformed into kinetic energy and heats the refrigerant 615A. The heat in the form of kinetic energy contained in boiler 610 becomes trapped and unable to escape to the outside as the kinetic energy of the heated refrigerant 615 A molecules is unable to penetrate and pass the vacuum barrier. The vacuum barrier 616 acts as a thermal insulator similar to that of a thermos. In utilizing this system, radiation energy is allowed to enter boiler 610 but the transformed kinetic energy, from the radiation, is prevented from escaping outside boiler 610. The heat containment system helps prevents heat loss to outside the boiler 610 and forces the energy to pass through expander 370 as useful work.

The encasement 614 may be composed of transparent materials, or other materials capable of allowing the penetration of radiation or sun rays. It is noted that some electromagnetic radiation may reflect and leave the system.

The energy derived from the expansive section 600B, utilizing the one way heat system 600 may be implemented as a power source to operate any of the pre-mentioned compressive sections 100, 300B, 400A and 600A.

FIG. 6 illustrates the one way heat system 600 used in conjunction with an expander 370 of the expansive section 600B. The energy derived from the expansive section 600B is a power source for operating compressor 304. This embodiment, however, illustrates that the condenser 307 may be placed externally from evaporator 306 and not necessarily being limited to being placed within evaporator 306. In this situation the heat given off by condenser 307, including the heat of condensation, is absorbed by its environment rather than evaporator 306.

The one way heat system is not intended to be restricted for use as described in this disclosure but may be useful in other applications such as the use of boilers to power steam generators or applications where it is desired to capture radiant energy and preclude kinetic energy from escaping.

Much of the heat utilized by the system is recycled. As previously discussed, the heat recycling embodiments are summarized as follows:

1) Positioning condenser 410 within evaporator 425 causing latent heat to be given-off by condenser 410 and absorbed by the 425 evaporator.

2) Placing the condensing probe 140 deep into a tube containing the incoming seawater 152 causing heat to be absorbed by the seawater 142.

3) Utilizing a counter current heat exchange 200 for the transfer of heat from the hot condensed water 220 emitted from the condenser 135 and condensing probe 140 to the incoming seawater 210, such that most of the heat of the condensed water 220 is transferred to the incoming seawater 210.

4) Diverting low grade heat, in the form of condensed water 220, away from the counter current heat exchange 200 and delivering it into the boiler 360. The diverted low grade heat of the condensed water 220 conducts heat to the liquid-phase refrigerant R410-A 351A contained in boiler 360, causing the liquid refrigerant R410-A 351A to boil in the boiler 360, thus helping to power the expander 370.

5) Utilizing a pre-warming system to warm incoming seawater from the sea by transferring heat from the condenser 380 to the seawater before it enters the holding reservoir 230.

6) Placing the piped outflow and storage containers 223 of condensed water 220 within the intake reservoir of the seawater, allowing the residual heat from the condensed seawater to transfer to the seawater in the holding reservoir 230.

Figure 7:
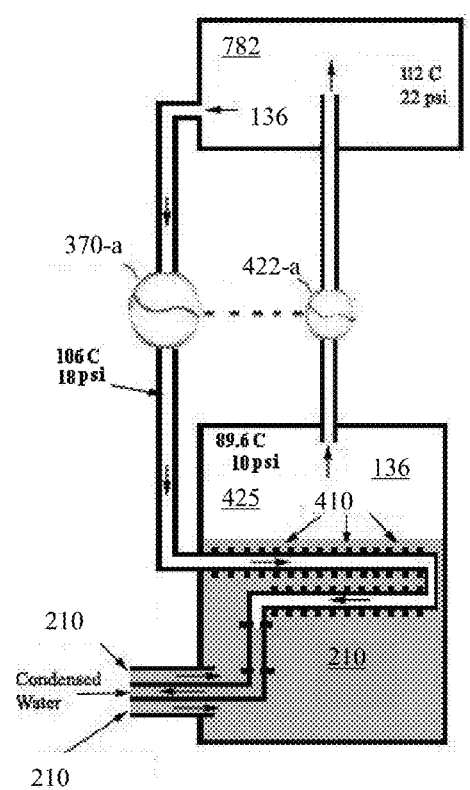
FIG. 7 illustrates a diagram of a distillation system with a mechanical advantage, wherein an expander displaces a greater volume of water vapor than the compressor connected to the expander, according to an aspect.

FIG. 7 illustrates a diagram of a distillation system with a mechanical advantage, wherein an expander displaces a greater volume of water vapor than the compressor connected to the expander, according to an aspect.

In further conservation of energy, the compressive portion of the system may be configured such that the compressor 422-a and a second expander 370-a are interconnected and transfer energy to one another. The expander 370-a may displace a greater volume of vapor 136 per revolution than the compressor 422-a does, producing a mechanical advantage system. The force exerted by the compressor 422-a and the expander 370-a may be in opposition and cancel each other out, resulting in the compressor 422-a and the expander 370-a to be in equilibrium.

In this configuration a pressured chamber may be created between the compressor 422-a and the expander 370-a, and may be referred to as a holding chamber 782. The compressor 422-a may be in fluid communication with the evaporator 425, and the expander 370-a may be in fluid communication with the condenser 410. Again, the expander 370-a may displace a greater volume of water vapor 136 than compressor 422-a does, creating a mechanical advantage system, wherein the pressure between the holding chamber 782 and condenser 410 is less than the pressure between the holding chamber 782 and evaporator 425. Thus, the difference in the temperature between the holding chamber 782 and condenser 410 may be less than the temperature between the holding chamber 782 and evaporator 425. In this manner the water vapor 136 entering condenser 410 may be at a higher temperature than that of the seawater 211 entering evaporator 425, causing a transfer of heat from condenser 410 to evaporator 425 and resulting in the seawater 211 in evaporator 425 to boil and the water vapor in condenser 410 to condense.

In order to maintain the temperature/pressure in the respective chambers, it is important to prevent the loss of heat to avoid disruption of the system. Hence, the respective chambers and interconnecting components should preferably be well insulated, such as, for example, by a vacuumed encasement.

The following chart lists examples of pressure and temperature in the respective chambers:

CHART 4

| | Water | |
|---|---|---|
| Holding Chamber: | Temperature 112 C. | Pressure 22 psi (denoted by P1 and P3) |
| Evaporator: | Temperature 89.6 C. | Pressure 10 psi (denoted by P2) |
| Condenser: | Temperature 106 C. | Pressure 18 psi (denoted by P4) |

The system in equilibrium is shown by the following equation:

$$V1(P1-P2)=V2(P3-P4)$$

If $V2$ or volume displaced by compressor 410=1 Cubic meter

Expansive Compressive $$(V1)(22-18) \text{ psi}=1 \text{ Cubic meter})(22-10) \text{ psi.}$$

($V1$)(4) psi=12 (Cubic meter) psi $V1$=3 Cubic meter            Equation 5

As an example, for the system to be at equilibrium, V1, the volume of the expander 370-*a*, must displace 3 cubic meters of volume per revolution while V2, the volume of the compressor 422-*a*, must displace 1 square meter of volume per revolution. In using the example pressure and temperature parameters listed in Chart 4, the expander 370-*a* must displace a volume of vapor greater than 3 cubic meters in order for the compressor 422-*a* to be capable of compressing vapor from evaporator 425 into the holding chamber 782. Additionally, a difference less than 12 psi, (which corresponds to a difference in temperature of 22.4 degrees C.), between the holding chamber 782 and the evaporator 425 is required for compressor 422-*a* to be capable of compressing vapor from evaporator 425 into the holding chamber 782. The compressor 422-*a* and/or expander 370-*a* may be equipped with, for example, a variable size drive pulley or other suitable means for controlling the pressure/temperature in the holding chamber 782.

It is noted that the major principles of recycling heat are generally described herein and that there may exist variants or deviations that produce an equivalent outcome. It is the purpose of the present invention to encompass these variations. All embodiments may be implemented solely or in conjunction with any combination with one another thereof.

As an example, when the system is at equilibrium, it is in a static state. The system may remain at equilibrium provided there is no displacement of vapor by either compressor 422-*a* or expander 370-*a* and no heat transfer from either of the chambers occur. However, in a dynamic state, expander 370-*a* may displace a greater volume of vapor than compressor 422-*a* does. Hence, compressor 422-*a* may be incapable of replenishing the volume of vapor into the holding chamber 782 in relation to the amount that is being drawn by expander 370-*a*. Consequently, the holding chamber 782 may quickly lose pressure and the mechanical advantage system may become disrupted.

Additionally, the density of water vapor is less at lower temperatures than it is at higher temperatures. As an example, if the temperature of evaporator 425 is lower than that of the temperature of the holding chamber 782, the density of water vapor in evaporator 425 is less than that of the holding chamber 782. Hence, again expander 370-*a* is expelling a greater quantity of vapor from the holding chamber 782 as compared to the amount of vapor aspirating from evaporator 425 and compressed into the holding chamber 782. Again, the holding chamber 782 loses pressure and the mechanical advantage system becomes disrupted in this example.

Figure 8:
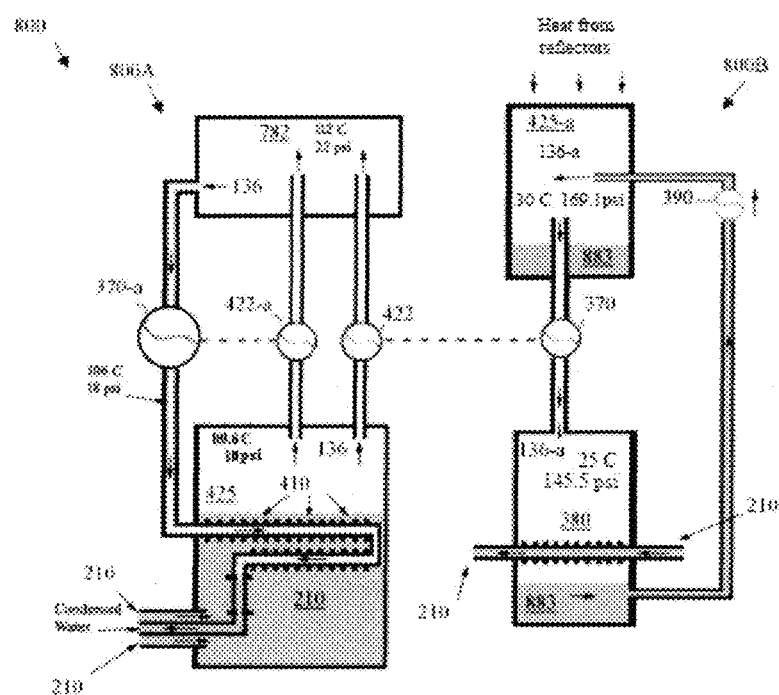
FIG. 8 illustrates a diagram of a distillation system having a chemical mechanical advantage system, according to an aspect.

FIG. 8 illustrates a diagram of a distillation system having a chemical mechanical advantage system, according to an aspect.

To compensate for the depletion of water vapor 136 in the holding chamber 782, additional vapor must preferably be aspirated from evaporator 425 and compressed into the holding chamber 782. To achieve this, a first compressor 422 may be configured between the first evaporator 425 and the holding chamber 782 and the vapor from first evaporator 425 ("first evaporator" or "evaporator 1") may be compressed into the holding chamber 782. The first compressor 422 ("first compressor" or "compressor 1") may be coupled to and powered by a first expander 370 of expansive section 800B ("expansive section," "expansive portion," "expansion section," or "expansion portion"). In this example, the expansive section 800B contains ammonia ($NH_3$) 883. As explained previously, the expander 370 may derive its energy from the difference in pressure between the second evaporator 425-*a* ("second evaporator" or "evaporator 2") and the second condenser 380, and there is an increase in pressure as the $NH_3$ liquid 883 boils in the second evaporator 425-*a* and a decrease in pressure as the $NH_3$ vapor 134-*a* condenses in the second condenser 380. The expansive section 800B may be fortified by, for example, solar energy applied to evaporator 425-*a* or replaced or augmented by a motor to either the first compressor 422 or first expander 370.

Further, the vapor 136 from the first evaporator 425 must preferably be compressed and stepped up to a pressure level that reaches at least the pressure of that of the holding chamber 782. The step up mechanism may be accomplished by the implementation of the first expander 370 of expansive section 800B in which expansive section 800B contains a fluid having different vapor pressure properties than that of water. This step up mechanism may be referred to as a chemical mechanical advantage system.

As shown in FIG. 8, in the system 800, water vapor is compressed from the first evaporator 425 into the holding chamber 782. In this example the system is driven by expansion section 800B and utilizes ammonia ($NH_3$) 883 as its fluid. $NH_3$ has different vapor properties than water. The difference in vapor properties may produce a chemical type mechanical advantage.

As an example, heat for the second evaporator 425-*a* is provided by solar heat and is heated to 30 C and the second condenser 380 ("second condenser" or "condenser 2") is cooled by sea water 210 at a temperature of 25 C. The temperature differential between the second evaporator 425-*a* and second condenser 380 drives the first expander 370 which in turn drives the first compressor 422, to which the first expander 370 is connected.

Chart 5 lists the parameters for equilibrium when using $H_2O$ in the compressive portion 800A of the system and $NH_3$ in the expansive portion 800B of the system.

CHART 5

| Compressive Section H2O | | |
|---|---|---|
| Holding Chamber: | Temperature 112 C. | Pressure 22 psi (denoted by P1) |
| Evaporator 1: | Temperature 89.6 C. | Pressure 10 psi (denoted by P2) |
| Expansive Section NH3 | | |
| Evaporator 2: | Temperature 30 C. | Pressure 169.1 psi (denoted by P3) |
| Condenser 2: | Temperature 25 C. | Pressure 145.5 psi (denoted by P4) |

Below is the derivation for the parameters shown in chart 5 using the following equation:

$V1(P1-P2)=V2(P3-P4)$

If $V1$ or volume displaced by compressor 1=1 cubic meter

Compressor 1 Expander 1

1 cubic meter(22−10) psi=($V2$)(169.1−145.5) psi.

(12) (cubic meter) psi=($V2$)23.6 psi 0.508 (cubic meter)=$V2$            Equation 6

For the system to be at equilibrium, V2 or expander 1 must displace 0.508 cubic meter of volume per revolution while V1 or compressor 1 must displace 1 meter sq. of volume per revolution. In using the above pressure and temperature parameters listed in chart 5, expander 1 must displace a volume of vapor greater than 0.508 in order for compressor 1 to be capable of compressing vapor from evaporator 1 into the holding chamber.

Conversely, if $V2$ or volume displaced by expander $1=1$ cubic meter then:

$V1(12)$ psi=(1 cubic meter)23.6 psi $V1=1.96$ (cubic meter)

Compressor 1 must displace a volume of vapor less than 1.96 in order for compressor 1 to be capable of compressing vapor from evaporator 1 into the holding chamber.

Additionally, a difference greater than 23.6 psi, (which corresponds to a difference in temperature of 5 degrees C.), between evaporator 2 and condenser 2 is required for compressor 1 to be capable of compressing vapor from evaporator 1 into the holding chamber. The heat differential may be obtained by heating evaporator 2 with a heating source such as implementing parabolic reflectors and/or, in the condensing side, introducing a cooling source into condenser 2 in the form of piped cool seawater.

It is noted that only a difference greater than 5 degrees C. between evaporator 2 and condenser 2 are required to compress vapor from condenser 1 into the holding chamber having a difference of temperature of 22.4 degrees C.

A pump may be necessary to pump the condensed liquid $NH_3$ from the low pressure second condenser 380 to the high pressure evaporator 425-a. Regulators (984 in FIG. 9) may be placed where needed within the system. The regulators may, for example, be in the form of pumps, one way valves or release valves in order to maintain proper pressure to make the system functional.

Figure 9:
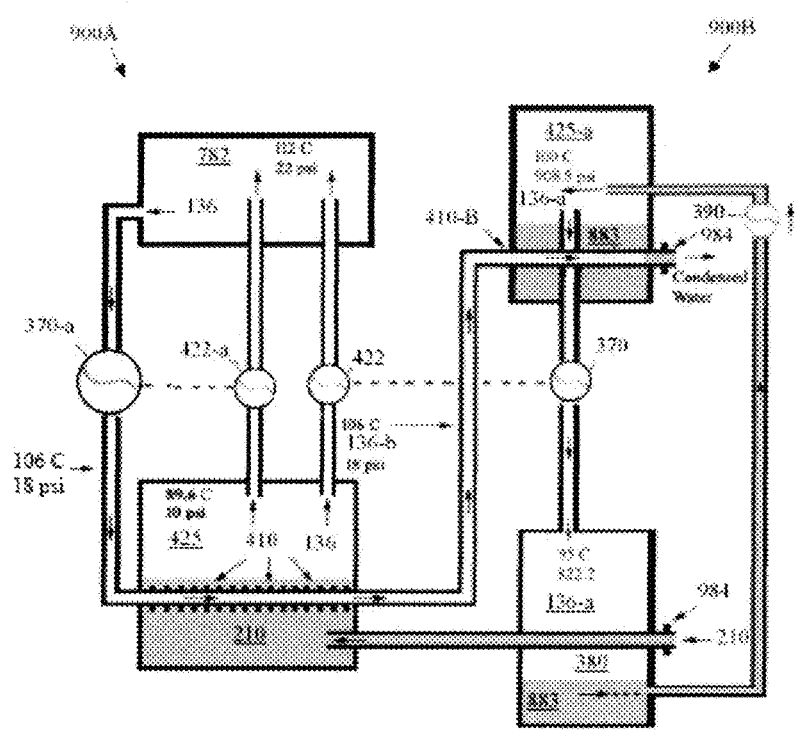
FIG. 9 illustrates a diagram of a distillation system in which excess vapor expelled from condenser 410 is directed to a condenser and into an evaporator, according to an aspect.

FIG. 9 illustrates a diagram of a distillation system in which excess vapor expelled from condenser 410 is directed to condenser 410-B and into evaporator 425-a, according to an aspect.

In the previous example, the second evaporator 425-a is primarily solar driven by the expansion section 800B. However, in another example, the excess vapor 136, not condensed by the first condenser 410, is directed into the second evaporator 425-a. The thermal energy from the vapor 136 directed from condenser 410, becomes recycled and drives or helps drive expander 370 and in turn drives the first compressor 422

FIG. 9 depicts an example where the excess vapor that has not been condensed in condenser 410 is delivered to condenser 410-B contained in evaporator 425-a of the expansive section 900B. Additionally, the hot water that has been condensed in condenser 410 is also delivered to condenser 410-B located within evaporator 425-a. The energy derived from the heat of the vapor or the mixture of vapor and/or condensate 136-b causes the $NH_3$ 883 to boil in evaporator 425-a causing an increase in pressure in evaporator 425-a and, simultaneously, as the $NH_3$ vapor 136-a condenses in condenser 380, expander 370 becomes actuated. Hence, the energy is recycled back, driving expander 370 and in turn compressor 422. In this manner the energy from the excess vapor and hot condensate that is emitted from condenser 410 is ultimately transformed and used to compress vapor from evaporator 425 into the holding chamber 782.

Further, heat given off by condenser 380 to the incoming piped cool seawater 210 may be redirected back and preheats the seawater 210 entering evaporator 425. The recycling of heat, anywhere possible, helps in conserving energy.

The expansive system, again may be part of a step up system and may utilize $NH_3$ as the second fluid. As previously discussed, the second fluid having different vapor pressure properties than that of water, produces a chemical type mechanical advantage.

As illustrated in FIG. 9, expander 370 may be configured between evaporator 425-a and condenser 380 and the energy derived, from the difference in temperature between evaporator 425-a and condenser 380, is delivered to expander 370 and is leveraged and stepped up and in turn transferred onto compressor 422. Compressor 422 subsequently aspirates vapor and induces boiling of the seawater in evaporator 425 and compresses the vapor to a pressure and temperature equal to or above that of the holding chamber 782.

Pumps may be implemented, where needed, to regulate the length of time the vapor/seawater 136-b are transferring heat to their respective components. The regulating pumps, in the form of pumps or release valves, assure that the proper temperatures and pressures within the system are maintained.

Chart 6 lists the parameters for equilibrium using $H_2O$ for the compressive portion of the system and $NH_3$ in the expansive portion of the system.

CHART 6

| Compressive H2O | | |
|---|---|---|
| Holding Chamber: | Temperature 112 C. | Pressure 22 psi (denoted by P1) |
| Evaporator 1: | Temperature 89.6 C. | Pressure 10 psi (denoted by P2) |
| Expansive NH3 | | |
| Condenser: | Temperature 100 C. | Pressure 908.5 psi (denoted by P3) |
| Evaporator 1: | Temperature 95 C. | Pressure 822.2 psi (denoted by P4) |

Below is the derivation for the example parameters shown in chart 5 using the following equation:

Compressive H2O Expansive NH3

$V1(P1-P2)=V2(P3-P4)$

If $V1$ or volume displaced by compressor $1=1$ cubic meter

Thus:

Compressor 1 Expander 1

1 cubic meter(22−10) psi=$(V2)$(908.5−822.2) psi.

(12) (cubic meter) psi=$(V2)$86.3 psi 0.134 (cubic meter)=$V2$      Equation 7

For the system to be at equilibrium, V2 or expander 370 (expander 1) must displace 0.134 meter sq. of volume per revolution while V1 or compressor 422 (compressor 1) must displace 1 meter sq. of volume per revolution.

In using the above pressure and temperature parameters in the example listed in chart 6, expander 370 must displace a volume of vapor greater than 0.134 in order for compressor 422 (compressor 1) to be capable of compressing vapor from evaporator 425 into the holding chamber 782.

Additionally, a temperature difference greater than 86.3 psi, (which corresponds to a difference of in temperature of 5 degrees C.), between evaporator 425-a and condenser 380 is required for compressor 422 to be capable of compressing vapor from evaporator 425 into the holding chamber 782.

The incoming seawater absorbs heat from the condensing $NH_3$ of condenser 380 and is directed to evaporator 425. Additional external heat may be applied as needed at any point within the system.

The outgoing condensate and the incoming seawater are subsequently entered into a counter current heat exchange system as previously illustrated in FIG. 2. Alternatively, the condensate may transfers its residual heat to the incoming seawater as it passes through a counter current latent heat exchange system (described in the next section).

The stepped up mechanism may also be achieved with the use of water as the second fluid as opposed to $NH_3$. However, the stepped up mechanism in this example is produced by conventional mechanical advantage in contrast to being produced by chemically induced mechanical advantage. The size of expander 370 would need to be increased to displace a greater volume of vapor than does compressor 422.

It should be understood that the illustrations previously discussed are only examples and the principles shown herein may also apply to other scenarios and applications using different fluids, mechanical ratios, temperature and pressure parameters, and so on.

Figure 10:
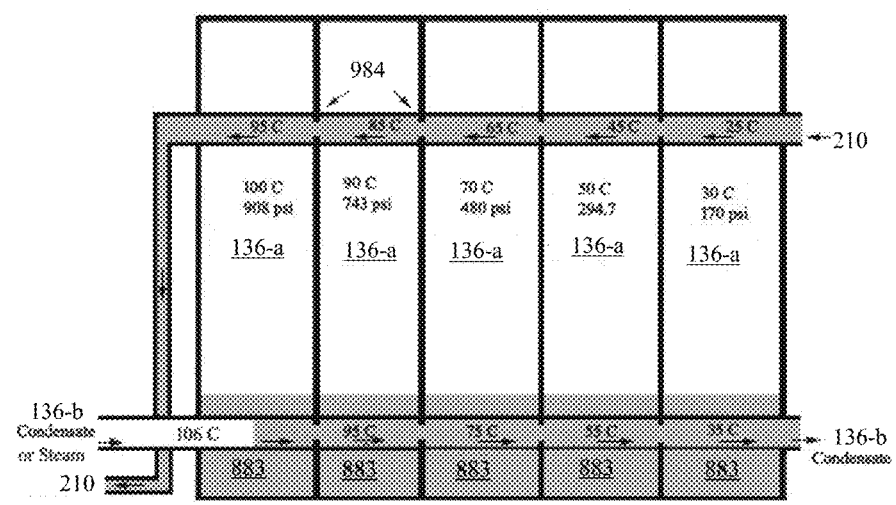
FIG. 10 illustrates a diagram of a distillation system having a counter current heat exchange system that transfers heat through latent heat, according to an aspect

FIG. 10 illustrates a diagram of a distillation system having a counter current heat exchange system that transfers heat through latent heat, according to an aspect.

The previously discussed counter current heat exchange system, described when referring to FIG. 2, may transfer heat by conduction without the use of latent heat. As an example, the following counter current heat exchange system transfers heat through the exchange of latent heat. The advantage of transferring heat through latent heat of vaporization and condensation is that it is a much more rapid process for transferring heat as compared to the transfer of heat by general conduction. In this example, this is possible, in that the available heat for transfer in latent heat of vaporization or condensation of water at 100 degrees C. is approximately 540 cal/g; thus, this provides a much more rapid process for transferring heat.

As an example, the hot vapor/steam and/or condensate 136-b emerging from condenser 410 and 410-B of FIG. 9 are passed through a thermal conductive conduit that is submerged in a liquid fluid, FIG. 10. In this example the liquid is $NH_3$ 883. However, any fluid may be used, including water. The heat from the steam and/or condensate 136-b conducts through the conduit, causing the liquid $NH_3$ 883 to boil and in the process absorbs latent heat. Above the boiling $NH_3$ a second conduit is positioned and transports cool seawater 210 in an opposite direction of that of the steam and/or condensate 136-b. As the vapor 136-a from the boiling $NH_3$ liquid rises it makes contact with the conduit carrying the cooler incoming seawater 210 causing the vapor 136-a to condense and fall back into the liquid $NH_3$ 888. As the $NH_3$ vapor 136-a condenses, its latent heat is transferred to the seawater 210.

The conduit carrying the hot condensate may act in part as a boiler or evaporator and the conduit carrying the cold seawater may act as a condenser.

To make the system effective, the counter current latent heat system may be compartmented in a series of compartments or cells. The compartmented cells may be segmentally enclosed and each cell may contain a liquid and vapor mixture of $NH_3$ and a segmented portion of the conduit containing cool seawater 210 (traveling in one direction), and below a second conduit containing hot condensate 136-b, (traveling in the opposite direction), as the process of the $NH_3$ vaporizing and condensing proceeds, heat exchange may occur between the conduit carrying the hot outgoing condensed water 136-b and the cool incoming seawater 210 as illustrated in FIG. 10. As an example, as the respective fluids within each conduit enters each succeeding cell, the temperatures of the condensate 136-b gradually decrease and the temperature of the seawater 210 increases. At the hot and the cold ends of the system, the condensate and the seawater should have close to the same temperature of one another. This principle may also apply to other applications where heat exchange from one fluid to another is desired. The hot fluid may be a vapor and or a liquid and exchange heat with a second fluid that may be a vapor and or a liquid.

The pressures of each compartment within the series may be regulated to support the process of boiling and condensing of the $NH_3$ relative to the temperature of the paired off incoming seawater 210 and outgoing condensate 136-b. Preferably, the temperature and corresponding pressure within each of the respective compartments should be approximately the average of the temperature of the respective portion of the piped outgoing condensate 136-b and the incoming sweater 210 within the particular compartment. Also, one-way valves 984, in both the hot and cold conduits, may be placed between each compartment, or where needed, to avoid backflow of fluid and help keep the temperatures of each compartment segregated. In this manner the temperature of the outgoing condensate 136-b is hotter than the liquid $NH_3$ 883, (causing the liquid $NH_3$ to boil) and conversely the temperature of the incoming seawater 210 is cooler than the $NH_3$ vapor 136-a, causing the $NH_3$ vapor 136-a to condense and precipitate to the bottom of the compartment. If another fluid other than $NH_3$ is used, for example water, the suitable parameters of temperature and pressure within each cell must be appropriately adjusted.

Figure 11:
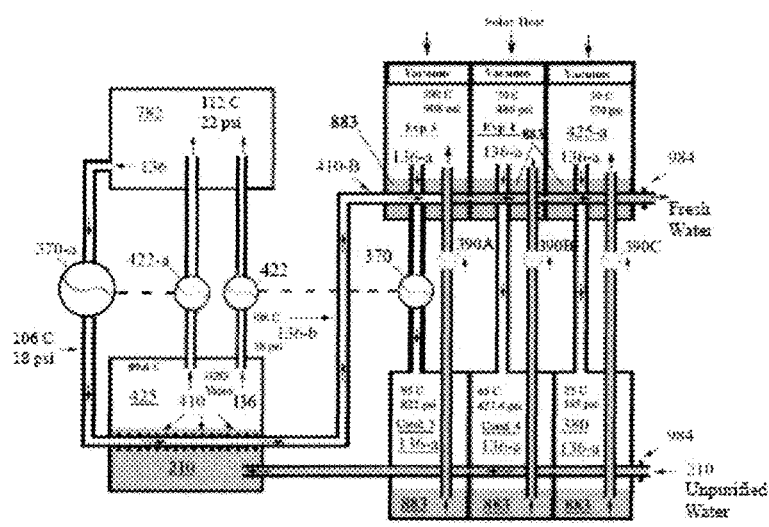
FIG. 11 illustrates a diagram of a distillation system utilizing a combination of the stepped up system using chemical mechanical advantage, and a counter current latent heat exchange system, according to an aspect.

FIG. 11 illustrates a diagram of a distillation system utilizing a combination of the stepped up system using chemical mechanical advantage (as previously described in FIG. 9), and a counter current latent heat exchange system (as previously described in FIG. 10), according to an aspect.

The advantage of combining the two systems is that first, the capability of leveraging and compressing the vapor from evaporator 425 into the holding chamber 782 is provided, and secondly, the use of latent heat of vaporization and condensation provides for a much more rapid process for transferring heat through the counter current heat exchange system.

In this example the series of evaporators (Evp 3, Evp 4, 425-a) and condensers (380, Cond 4, Cond 3) contain $NH_3$. The conduit carrying the hot condensate or vapor 136-b is passed through each successive compartment within the series of evaporators (Evp 3, Evp 4, 425-a). Conversely, the conduit carrying the cool sweater 210, (in the opposite direction), is passed through each successive compartment within the series of condensers (380, Cond 4, Cond 3). The conduit carrying the hot condensate is located above the conduit carrying the cold seawater 210. Again, the hot condensate 136-b and cold seawater 210 travel in opposite directions within their respective conduits, and, in each cell, the conduit carrying the hot condensate 136-b gives off heat and causes boiling of the $NH_3$ within its respective evaporators (Evp 3, Evp 4, 425-a) and the conduit carrying the cold seawater 210 absorbs heat from the $NH_3$ Vapor 136-*a* within its respective condensers (Cond 3, Cond 4 and 380). The vapor 136-*a* produced by (Evp 3, Evp 4, 425-*a*) is communicated and condensed by condensers (Cond 3, Cond 4 and 380) respectively. Expander 370 is configured between Evp 3 and Cond 3 and may drive compressor 422. Its energy is derived from the difference in pressure of evaporator Evap 3 and condenser Cond 3 and may serve as a step up system using chemically induced mechanical advantage.

Pumps (390A, 390B, 390C) may be necessary to pump the precipitated liquid $NH_3$ from each of the respective low pressure condensers (Cond 3, Cond 4, 380) to its paired high pressure evaporator in each cell. One-way valves may be placed where needed, to help keep each compartment thermally segregated within the system. Regulators 984 may also, for example, be in the form of pumps or release valves in order to maintain proper pressure to make the system functional.

The evaporator of any of the compartments of the system may be fortified by the implementation of heat, either provided by solar parabolic reflectors or other means. The illustration in FIG. 11 depicts 3 compartments containing evaporators (Evp 3, Evp 4, 425-*a*) as well as their respective expanders and condensers. However, the use of a greater number of chambers provides for a more gradual temperature gradient between the incoming sweater and condensate and improves the efficiency of the system.

The series of compartmentalized evaporators (Evp 3, Evp 4, 425-*a*) may be encased with a vacuumed one-way heat system. As previously discussed, heat from sun rays reflected from parabolic reflectors or the like penetrate the glass encasement, contributing heat to the series of evaporators (Evp 3, Evp 4, 425-*a*) causing the $NH_3$ 883 refrigerant to boil. Sun rays are electromagnetic radiation carrying heat. Again, as previously discussed since electromagnetic waves are not impeded by a vacuum, heat can be transferred through a vacuum via radiation. The heat in the evaporators becomes trapped and unable to escape to the outside as the kinetic energy of the refrigerant molecules are unable to penetrate and pass the vacuum barrier. This configuration may become a heat trap per se.

The system may be composed of numerous cells to assure a gradually heat exchanged between the condensate 136-*b* to the incoming seawater 210. In the process heat is given off from the condensate to the incoming seawater and simultaneously the temperature of the incoming seawater gradually increases as it absorbs heat from the condensate. As the respective fluids within each conduit enters each succeeding cell, the temperatures of the condensate 136-*b* gradually decrease and the temperature of the seawater 210 increases. At the hot and the cold ends of the system, the condensate and the seawater should have close to the same temperature of one another.

Figure 12:
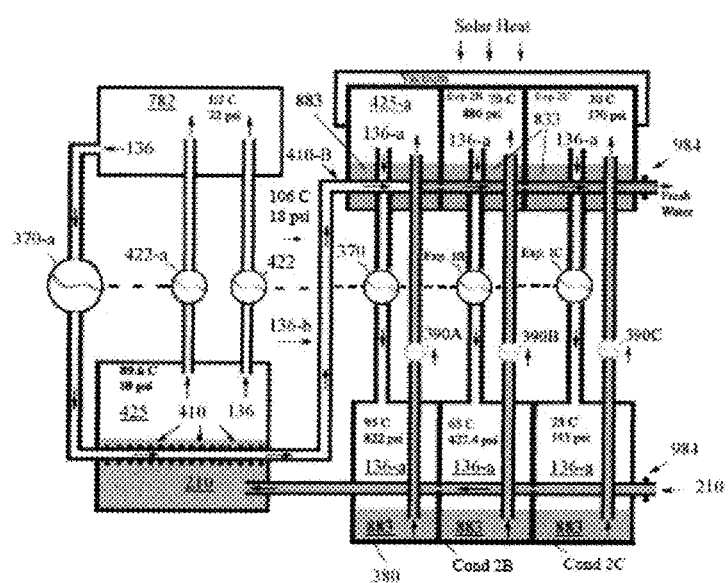
FIG. 12 illustrates a diagram of a distillation system having cells, wherein each cell contains its own evaporator, condenser and expander, and, also has incorporated the counter current latent heat exchange system, according to an aspect.

FIG. 12 illustrates a diagram of a distillation system having cells, wherein each cell contains its own evaporator, condenser and expander, in which they are configured and function similar to that described in the segmented cell containing the paired Evp3 and Cond 3 of FIG. 11, and, also has incorporated the counter current latent heat exchange system (as previously discussed in FIG. 9 and FIG. 11), according to an aspect.

The expanders are depicted as 370, Exp. 1B and Exp. 1C, and may be in communication with their respective evaporator and condenser. Each cell may function as an independent unit. However, the expanders of each cell may be interconnected in series and may be configured to function cumulatively. Each expander within each cell may serve as a step up system using chemically induced mechanical advantage energy derived from the difference in pressure of its respective evaporator (425-*a*, Evp 2B, Evp 2C) and condenser (380, Cond 2B, Cond 2C) and the energy derived from each cell is delivered to their respective expander and summed together and transmitted to power compressor 422. Again, pumps (390A, 390B, 390C) may be necessary to pump the precipitated liquid $NH_3$ from the respective low pressure condenser to the paired high pressure evaporator in each cell. Regulators 984 in the form of pumps or release valves as well as one-way valves may be used to maintain proper function of the system, and, the series of compartmentalized evaporators (425-*a*, Evp 2B, Evp 2C), may be encased with a vacuumed one-way heat system.

This example utilizes $NH_3$ as the step up fluid. However, other fluids may be used including water. However, with each fluid, suitable parameters with regard to temperature and pressure must be appropriately adjusted and maintained within each cell in order for the system to function.

In the case of using water as opposed to $NH_3$, the stepped up mechanism is produced by conventional mechanical advantage in contrast to being produced by chemically induced mechanical advantage. The expanders in the series of cells cumulatively sum together to displace a greater volume of vapor than does compressor 422, resulting in a conventional mechanical advantage, as described in FIG. 13.

Figure 13:
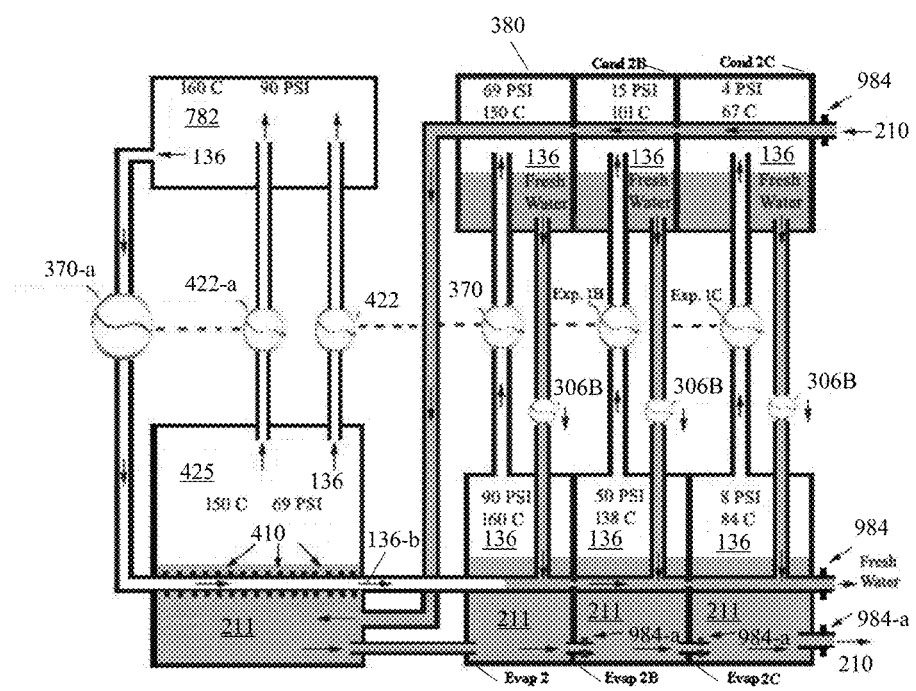
FIG. 13 illustrates a diagram of a distillation system having a counter current latent heat exchange system using solely water, according to an aspect.

FIG. 13 illustrates a diagram of a distillation system having a counter current latent heat exchange system using solely water, according to an aspect. This is considered when the use of $NH_3$ is not desired. In this example water itself is used.

As an example, heated brine 211 from evaporator 425 is conveyed through a series of evaporator cells (Evap 2, Evap 2B, Evap 2C). Additionally, condensate and/or steam 136-*b* from condenser 410, is concurrently transported through a conduit through the same series of evaporator cells. The heat from the steam and condensate 136-*b* is absorbed by the seawater brine 211 of each evaporator cell causing the seawater brine 211 to boil. The pressure and temperature within each respective evaporator cell is such that the brine within each cell boils. As the brine progresses through the evaporators of each successive cell via regulating pumps 984-*a*, the temperature of the brine may become lower as heat is given off to the evaporator of each cell. Simultaneously, the salt content may become more concentrated as more and more of the brine boils off.

Concurrently, at the opposite end of the counter current latent heat exchange system, seawater 210 of lower temperature is introduced into the series of condensers (Cond 2C, Cond 2B, 380). The seawater 210 flows through a conduit and is configured to flow through the series of condensers in the opposite direction of the condensate 136-*b* that flows through the series of evaporators. As the seawater progresses through the condenser of each successive cell, heat is absorbed from the surrounding water vapor 136, (that has been created by the boiling of brine in its respective evaporator). Consequently, the temperature of the incoming seawater 210 progressively becomes greater. As the water vapor 136 comes in contact with the cooler piped seawater 210, it condenses and precipitates to the button of its respective condenser and is subsequently pumped to and joins the condensate 136-*b*. In this manner the heat remaining in the precipitated water vapor is used again in the successive evaporators.

Similar to the system described in FIG. 12, the expanders are depicted as 370, Exp. 1B and Exp. 1C, and may be in communication and are located between their respective evaporator and condenser within the series. Each cell may function as an independent unit. Energy derived from the difference in pressure of the boiling brine 211 of the evaporators and the condensing of vapor 136 within the condensers in each cell, may be transferred to their respective expander. Because the expanders are interconnected in series, the energy of the expanders (370, Exp. 1B and Exp. 1C), may function cumulatively and sum together. The resulting summation of energy in turn may be transmitted to power compressor 422. The expanders when arranged in series, cumulatively displace a greater volume of vapor 136 than does compressor 422, resulting in a conventional mechanical advantage and stepped up mechanism.

Again pumps (390A, 390B, 390C) may be necessary to pump the precipitated liquid from the respective low pressure condenser to the paired high pressure evaporator in each cell. Regulators 984 and 984-*a* in the form of pumps or release valves as well as one-way valves may be used to maintain proper function of the system.

Alternatively, the energy generated by each expander within each cell, may be coupled to and transferred to a separate and designated compressor placed between evaporator 425 and the holding chamber 782. This configuration would result in a plurality of compressors, located within evaporator 425, being coupled to a designated expander within the series of cells. This is in contrast to the series of evaporators being coupled to a single compressor located within evaporator 425.

It should be understood that the major principles of recycling heat are generally described herein and that there may exist variants or deviations that produce an equivalent outcome. It is the purpose of this disclosure to encompass these variations.

All embodiments described herein may be used solely or in any combination with one another as well as in partial form. Also, it should be understood that the use of, for example, pumps, one way valves or release valves, vacuumed one-way heat system, and so on, are utilized where needed, and in some descriptions are not mentioned in order to simplify the descriptions and avoid being redundant.

Although specific embodiments have been illustrated and described herein for the purpose of disclosing the preferred embodiments, someone of ordinary skills in the art will easily detect alternate embodiments and/or equivalent variations, which may be capable of achieving the same results, and which may be substituted for the specific embodiments illustrated and described herein without departing from the scope of the invention. Therefore, the scope of this application is intended to cover alternate embodiments and/or equivalent variations of the specific embodiments illustrated and/or described herein. Hence, the scope of the invention is defined by the accompanying claims and their equivalents. Furthermore, each and every claim is incorporated as further disclosure into the specification and the claims are embodiment(s) of the invention.

What is claimed is:

1. An energy recycling system comprising:
a first evaporator containing in a first portion a first liquid having a first temperature which is at the first liquid's boiling point; a holding chamber in which a first quantity of a first vapor of the first liquid received from the first evaporator is compressed by a first compressor, thus causing the first vapor in the holding chamber to have a second temperature, higher than the first temperature; a first expander configured to drive the first compressor and to displace a second quantity of the first vapor from the holding chamber to a first conduit, having thermo-conductive properties, wherein the first conduit functions as a first condenser, further the second quantity of the first vapor displaced by the first expander is greater than the first quantity of the first vapor displaced by the first compressor, thus causing a third temperature of the first vapor in the first conduit to be lower than the second temperature but higher than the first temperature, thus causing a heat transfer from the first vapor in the first conduit to the first liquid, and thus the boiling of the first liquid, when the first conduit passes through the first evaporator; a second compressor configured to compress a third quantity of the first vapor into the holding chamber, to compensate for the difference between the first and second quantities.

2. The energy recycling system of claim 1 wherein a second expander configured to drive the second compressor, the second expander displacing into a second condenser and being driven by a second vapor of a second liquid contained by a second evaporator, the second liquid having a fourth temperature which is at the second liquid's boiling point but is lower than the third temperature, such that boiling of the second liquid occurs, generating the second vapor when the first conduit passes through the second evaporator;
wherein, a difference between the fourth temperature and a fifth temperature of the second vapor in the second condenser is lower than a difference between the first and second temperature.

3. The energy recycling system of claim 2, wherein a mechanical advantage is applied between the second expander and the second compressor, the mechanical advantage is achieved by at least one of the group consisting of the second expander displacing a greater volume of vapor than the second compressor and the second expander displacing vapor having different vapor pressure properties than that displaced by the second compressor.

4. The energy recycling system of claim 2, wherein, while the first conduit containing a first fluid comprised of at least one member of the group consisting of the first vapor and a condensate of the first vapor passes through the first and second evaporator, at least a portion of the first vapor within the first conduit condenses into the condensate of the first vapor, further comprising a second conduit, having thermo-conductive properties, transporting the first liquid, having a sixth temperature lower than the fifth temperature, to the first evaporator after passing through the second condenser and absorbing therein heat from the second vapor, causing condensation of the second vapor, further a pump for pumping the second liquid from the second condenser to the second evaporator is provided.

5. The energy recycling system of claim 4, wherein the second conduit is passed through at least one additional condenser before reaching the second condenser and first evaporator, so that the first liquid absorbs heat also from the at least one additional condenser, the first condenser and the at least one additional condenser forming a series of condensers, leading to the second condenser and first evaporator, with gradually increasing temperatures, and wherein the first conduit, leaving the first evaporator and into the second evaporator and passing, through at least one additional evaporator, so that the first fluid loses heat also to the at least one additional evaporator, the second evaporator and the at least one additional evaporator forming a series of evaporators with gradually decreasing temperatures.

6. The energy recycling system of claim 5, wherein between each pair of the at least one additional evaporator and the at least one additional condenser an additional expander is placed and used to help drive the second compressor, further providing an additional pump to pump the second liquid from the at least one additional condenser to the at least one additional evaporator.

7. The energy recycling system of claim 6 wherein the first conduit and the second conduit, are further passed through a plurality of compartments, each compartment of the plurality of compartments comprised of a first section and a second section containing a second fluid comprised of the second liquid and the gas-phase of the second liquid and being positioned adjacent to each other, further each of the first sections function as an integrated evaporator, the first conduit containing the first fluid, submerged and passing through the second liquid of the first section in each of the compartments of the plurality of compartments, and wherein the temperature of the second liquid at its boiling point, absorb heat from the first fluid contained in the first conduit causing at least a portion of the second fluid to boil into the gas-phase of the second liquid, further, each of the compartments of the plurality of compartments comprised of the second section, functioning as a integrated condenser, the second conduit passing through the second section, of each of the compartments of the plurality of compartments, wherein the temperature of the second fluid contained in the second section is greater than the temperature of the second conduit containing the first liquid, where the gas-phase of the second liquid come in contact with the second conduit, causing the gas-phase of the second liquid to lose latent heat and condense into the liquid-phase of the second liquid.

8. The energy recycling system of claim 4 wherein the first liquid is water and the second liquid is ammonia.

9. The energy recycling system of claim 4 wherein the system is used to distillate the first liquid.

10. The energy recycling system of claim 5 wherein at least an evaporative portion of the system is insulated using a vacuum encasement.

11. The energy recycling system of claim 1, wherein a heat exchange system comprising at least one closed compartment containing in a first portion a second liquid having a fourth temperature which is at the fourth liquid's boiling point; the first conduit, after passing through the first evaporator, containing a first fluid comprised of at least one of the group consisting of the first vapor and the condensate of the first vapor having the third temperature which is higher than the fourth temperature and submerged in the second liquid, causing at least a portion of the second liquid to absorb heat from the third temperature and boil within the first portion of the at least one closed compartment, and thus convert to a second vapor; and, transporting the first liquid to the first evaporator from a second portion of the at least one closed compartment and having a sixth temperature, which is lower than the fourth temperature, and passing through the second portion of the at least one closed compartment where the second vapors, come in contact with the second conduit containing the first liquid having the sixth temperature, causing the second vapors to lose heat and condense, and thus join the second liquid in the second portion of the at least one closed compartment; further comprising a pump for the delivery of the second liquid from the second portion to the first portion of the at least one closed compartment.

12. The energy recycling system of claim of claim 11 wherein the system comprises a plurality of closed compartments, which are adjacent to each other, each closed compartment having a pressure and thus corresponding fourth temperature and boiling point, such that to create a series of closed compartments having a gradually changing fourth temperature and corresponding boiling point of the second liquid from a first end of the series to an opposite second end, as the first fluid travels through the first conduit from the first end to the second end of the series and the first liquid travels through the second conduit from the second end to the first end of the series, where the fourth temperature in each closed compartment is lower than the corresponding third temperature and higher than the sixth temperature.

13. The energy recycling system of claim 12 wherein a system to drive the second compressor consist of a second expander coupled to the second compressor, the second expander configured between the first portion and the second portion of the at least one closed compartment; and the second portion having a fifth temperature lower than the first portion having the fourth temperature, and the second expander powered by the temperature and corresponding pressure difference between the first portion and second portion of the at least one closed compartment.

14. The energy recycling system of claim 13, wherein a mechanical advantage is applied between the second expander and the second compressor, the mechanical advantage is achieved by at least one of the group consisting of the second expander displacing a greater volume of vapor than the second compressor and the second expander displacing vapor having different vapor pressure properties than that displaced by the second compressor.

15. The energy recycling system of claim 13, in a heat containment application, wherein the first portion of the at least one closed compartment containing the second liquid and, comprising an encasing encapsulating the first portion of the at least one closed compartment and a vacuum disposed within the encasing, and the encasing allows energy in the form of radiation to penetrate the encasing and the vacuum layer, and the radiation energy transforms into kinetic energy as radiation energy heats and boils the second liquid contained in the first portion of the at least one closed compartment, further the heat in the form of kinetic energy is incapable of penetrating and passing through the vacuum layer, thus preventing the loss of heat to the outside of the encasing of the first portion of the at least one closed compartment resulting in greater energy efficiency to drive the expander.

16. The energy recycling system of claim 7, wherein the first conduit passes through first section and the second conduit passing through the second section of each of the compartments of the plurality of compartments thus creating a series the compartments with the second liquid in each of the first sections having gradually decreasing boiling points from a first end of the series to an opposite second end, such that the boiling point of the second liquid in each of the first sections is lower than the corresponding third temperature and higher than the corresponding sixth temperature, as the first fluid travels through the first conduit from the first end to the second end of the series and having gradually increasing temperature in the second sections as the first liquid travels through the second conduit from the second end to the first end of the series.

17. The energy recycling system of claim 2, wherein the first liquid is water and the second liquid is water.

18. The energy recycling system of claim 11, wherein the first liquid and the second liquid is water.

19. The energy recycling system of claim 6, wherein the energy derived from each additional expander are summed together and transmitted to power the second compressor.

20. The energy recycling system of claim 13, wherein the energy derived from each second expander of the at least one closed compartment are summed together and transmitted to power the second compressor.

\* \* \* \* \*